(12) United States Patent
Cheng et al.

(10) Patent No.: US 11,809,958 B2
(45) Date of Patent: Nov. 7, 2023

(54) SYSTEMS AND METHODS FOR AUTOMATIC DECISION-MAKING WITH USER-CONFIGURED CRITERIA USING MULTI-CHANNEL DATA INPUTS

(71) Applicant: Capital One Services, LLC, McLean, VA (US)

(72) Inventors: Lin Ni Lisa Cheng, Fresh Meadows, NY (US); Ljubica Chatman, New York, NY (US); David Gabriele, New York, NY (US); Tyler Maiman, Melville, NY (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 485 days.

(21) Appl. No.: 16/897,887

(22) Filed: Jun. 10, 2020

(65) Prior Publication Data

US 2021/0390445 A1 Dec. 16, 2021

(51) Int. Cl.
*G06N 20/00* (2019.01)
*G06F 3/01* (2006.01)
(Continued)

(52) U.S. Cl.
CPC .............. *G06N 20/00* (2019.01); *G06F 3/015* (2013.01); *G06F 3/017* (2013.01); *G06F 9/542* (2013.01); *G06F 2203/011* (2013.01); *G06N 3/08* (2013.01)

(58) Field of Classification Search
CPC .... G06N 20/00; G06N 3/0454; G06N 3/0445; G06N 3/02; G06N 7/005; G06F 40/30;
(Continued)

(56) References Cited

U.S. PATENT DOCUMENTS 5,806,033 A * 9/1998 Lyberg ................ G10L 15/1807
704/211
8,341,109 B2 12/2012 Sim et al.
(Continued)

FOREIGN PATENT DOCUMENTS

AU 2014101364 A4 12/2014
CA 2760285 C 8/2017
(Continued)

*Primary Examiner* — Krishna P Neupane
(74) *Attorney, Agent, or Firm* — HUNTON ANDREWS KURTH LLP

(57) ABSTRACT

Systems and methods for decision-making with multi-channel data inputs are provided. The system includes a plurality of devices, and a server in data communication with the plurality of devices. The server includes a decision engine, a sentiment analysis machine learning model, and a behavior analysis machine learning model. The server is configured to: receive the at least one data input from each of the plurality of device; perform, using the sentiment analysis machine learning model, a sentiment analysis on the at least one data input to generate sentiment information indicative of an emotional state of a user; perform, using the behavior analysis machine learning model, a behavior analysis on the at least one data input to generate behavior information indicative of a behavioral state of the user; determine, using the decision engine, a responsive action based on the sentiment information and the behavior information; and perform the responsive action.

20 Claims, 10 Drawing Sheets

(51) Int. Cl.
*G06F 9/54* (2006.01)
*G06N 3/08* (2023.01)

(58) Field of Classification Search
CPC .......... G06F 40/20; G06F 3/011; G06F 3/015; G06F 3/017; G06F 3/013; G06F 3/16; G06F 3/01; G06F 16/3329; G06F 1/163; G06F 17/18

See application file for complete search history.

(56) References Cited

U.S. PATENT DOCUMENTS

| | | | |
|---|---|---|---|
| 9,270,778 | B1 | 2/2016 | Brown |
| 9,542,489 | B2 | 1/2017 | Fleischman et al. |
| 9,864,807 | B2 | 1/2018 | Balmin et al. |
| 9,883,838 | B2 | 2/2018 | Kaleal, III et al. |
| 9,940,576 | B1 | 4/2018 | Dey et al. |
| 2003/0182123 | A1 | 9/2003 | Mitsuyoshi |
| 2007/0259325 | A1 | 11/2007 | Clapper |
| 2010/0017348 | A1 | 1/2010 | Pinckney et al. |
| 2010/0235854 | A1 | 9/2010 | Badgett |
| 2010/0266213 | A1 | 10/2010 | Hill |
| 2010/0312792 | A1 | 12/2010 | Ando et al. |
| 2010/0332648 | A1 | 12/2010 | Bohus et al. |
| 2012/0002848 | A1 | 1/2012 | Hill |
| 2012/0209793 | A1 | 8/2012 | Morris |
| 2013/0173725 | A1 | 7/2013 | Ventilla et al. |
| 2013/0211838 | A1 | 8/2013 | Park et al. |
| 2013/0246174 | A1 | 9/2013 | Davidson et al. |
| 2013/0325437 | A1 | 12/2013 | Lehman et al. |
| 2013/0325992 | A1 | 12/2013 | McGann et al. |
| 2014/0039975 | A1 | 2/2014 | Hill |
| 2014/0108309 | A1 | 4/2014 | Frank et al. |
| 2014/0134581 | A1 | 5/2014 | Hogan et al. |
| 2014/0172920 | A1 | 6/2014 | De Souza |
| 2014/0308634 | A1 | 10/2014 | Mishra et al. |
| 2014/0317120 | A1 | 10/2014 | Ghose |
| 2014/0323817 | A1 | 10/2014 | el Kaliouby et al. |
| 2014/0365979 | A1* | 12/2014 | Yoon ................ H04M 1/72412 715/863 |
| 2015/0039405 | A1 | 2/2015 | Frank et al. |
| 2015/0099257 | A1 | 4/2015 | Kozloski et al. |
| 2015/0100521 | A1 | 4/2015 | Kozloski et al. |
| 2015/0106155 | A1 | 4/2015 | Castellanos et al. |
| 2015/0127593 | A1 | 5/2015 | Gramuglio et al. |
| 2015/0169832 | A1* | 6/2015 | Davis ................ G06F 3/0346 702/19 |
| 2015/0179078 | A1 | 6/2015 | Spagnola |
| 2015/0213002 | A1 | 7/2015 | Gou et al. |
| 2015/0221229 | A1 | 8/2015 | Cannon et al. |
| 2015/0356512 | A1 | 12/2015 | Bradley |
| 2016/0015307 | A1 | 1/2016 | Kothuri |
| 2016/0027452 | A1* | 1/2016 | Kalinli-Akbacak .... G10L 17/26 704/240 |
| 2016/0055253 | A1 | 2/2016 | Herzig et al. |
| 2016/0170998 | A1 | 6/2016 | Frank et al. |
| 2016/0182553 | A1* | 6/2016 | Tripp .................... G06F 21/577 726/25 |
| 2016/0196635 | A1* | 7/2016 | Cho ........................ G16Z 99/00 345/660 |
| 2016/0217139 | A1 | 7/2016 | Kapur et al. |
| 2016/0331279 | A1 | 11/2016 | Shpin et al. |
| 2016/0358086 | A1 | 12/2016 | Sundram et al. |
| 2016/0364733 | A1 | 12/2016 | Fei et al. |
| 2017/0004270 | A1 | 1/2017 | Van De Craen et al. |
| 2017/0004517 | A1 | 1/2017 | Jaggi et al. |
| 2017/0076618 | A1 | 3/2017 | Smith et al. |
| 2017/0192994 | A1 | 7/2017 | Hong et al. |
| 2017/0220553 | A1 | 8/2017 | Breedvelt-Schouten et al. |
| 2017/0256177 | A1 | 9/2017 | Abrahams et al. |
| 2018/0089715 | A1 | 3/2018 | Ken-Dror |
| 2018/0168498 | A1 | 6/2018 | Bernstein et al. |
| 2018/0342004 | A1 | 11/2018 | Yom-Tov et al. |
| 2018/0342171 | A1 | 11/2018 | Darnell et al. |
| 2018/0350251 | A1 | 12/2018 | Baker et al. |
| 2018/0365656 | A1 | 12/2018 | Mersereau et al. |
| 2019/0050774 | A1 | 2/2019 | Divine et al. |
| 2019/0122071 | A1 | 4/2019 | Jin et al. |
| 2019/0272382 | A1* | 9/2019 | Dubyak .................. G06F 40/30 |
| 2019/0276037 | A1* | 9/2019 | Ito ............................ G08G 1/16 |
| 2020/0022631 | A1* | 1/2020 | Lee .......................... G06N 3/08 |
| 2020/0050897 | A1* | 2/2020 | Dong ..................... G16H 50/20 |
| 2020/0342550 | A1* | 10/2020 | Halimsaputera ....... G16H 20/60 |
| 2021/0200955 | A1* | 7/2021 | Ben Kimon ......... G06N 3/044 |
| 2021/0350917 | A1* | 11/2021 | Curtis .................... G16H 50/20 |

FOREIGN PATENT DOCUMENTS

| | | |
|---|---|---|
| CA | 2965070 A1 | 5/2018 |
| EP | 2741249 A1 | 6/2014 |
| EP | 2940645 A1 | 11/2015 |
| WO | 2013040104 A1 | 3/2013 |
| WO | 2013158768 A1 | 10/2013 |
| WO | 2015013436 A2 | 1/2015 |
| WO | 2019078789 A2 | 5/2018 |
| WO | 2018162955 A1 | 9/2018 |
| WO | 2018220401 A1 | 12/2018 |

* cited by examiner

SYSTEMS AND METHODS FOR AUTOMATIC DECISION-MAKING WITH USER-CONFIGURED CRITERIA USING MULTI-CHANNEL DATA INPUTS

FIELD OF THE INVENTION

The present disclosure relates generally to machine learning, and more particularly, to systems and methods for automatic decision-making with multi-channel data inputs using user-configured criteria.

BACKGROUND

An emotional state and a behavioral state of a person can significantly impact decision-making. For example, a person experiencing a fast heart beat and/or a hypertension may behave abnormally, which may indicate that calling a doctor or an ambulance is needed. Accurate evaluation of an emotional state and/or a behavioral state of a person is necessary for performing proper actions in response to those states. However, in conventional technologies, evaluation of an emotional state and/or a behavioral state of a person is generally poorly performed, which may cause improper actions to be taken. For example, an application may use self-report emoji or mood to detect an emotional state of a person who uses a device on which the application is installed, which may identify a false or inaccurate emotional state of the person.

As another example, conventional technologies often do not take appropriate action once an emotional or behavioral state of a person is detected. If the action taken is not appropriate or not consistent with the user's wishes, then the user's emotional or behavioral state may be worsened.

These and other deficiencies exist. Accordingly, there is a need to provide solutions that overcome these deficiencies to more accurately evaluate an emotional state and/a behavioral state of a person, such that an action performed based on the evaluated emotional state and/or a behavioral state can be appropriate and consistent with what the user requires.

SUMMARY

Aspects of the disclosed technology include systems and methods for decision making using multi-channel data inputs with user-configured criteria.

Embodiments of the present disclosure provide a system for decision-making with multi-channel data inputs. The system comprises an application comprising instructions for execution on a plurality of devices. The application is configured to communicate at least one data input received by each of the plurality of devices to a server. The system further comprises the server in data communication with the plurality of devices. The server comprises a decision engine, a sentiment analysis machine learning model, and a behavior analysis machine learning model. The server is configured to: receive the at least one data input from each of the plurality of device; perform, using the sentiment analysis machine learning model, a sentiment analysis on the at least one data input to generate sentiment information indicative of an emotional state of a user; perform, using the behavior analysis machine learning model, a behavior analysis on the at least one data input to generate behavior information indicative of a behavioral state of the user; determine, using the decision engine, a responsive action based on the sentiment information and the behavior information; and perform the responsive action.

Embodiments of the present disclosure provide a server for decision-making with multi-channel data inputs. The server comprises a processor, a decision engine, a sentiment analysis machine learning model, and a behavior analysis machine learning model. The sentiment analysis machine learning model is configured to generate information indicative of an emotional state of a user, and the behavior analysis machine learning model is configured to generate information indicative of a behavioral state of the user. The processor is configured to: receive at least one data input from each of a plurality of devices, wherein each of the plurality of devices comprises an application comprising instructions for execution on the plurality of devices, and the application is configured to communicate the at least one data input to the server; perform, using the sentiment analysis machine learning model, a sentiment analysis on the at least one data input to generate sentiment information indicative of the emotional state of the user; perform, using the behavior analysis machine learning model, a behavior analysis on the at least one data input to generate behavior information indicative of the behavior state of the user; determine, using the decision engine, a responsive action based on the sentiment information and the behavior information; and perform the responsive action.

Embodiments of the present disclosure provide a method for decision-making with multi-channel data inputs. The method comprises: generating, by a plurality of devices, a plurality of data comprising image data, voice data, text data, geolocation data, biometric data, transactional data, and user metadata; training, using the plurality data, a sentiment analysis machine learning model and a behavior analysis machine learning model; receiving, by a server, at least one data input from each of the plurality of devices, wherein each of the plurality of devices comprises an application comprising instructions for execution on the plurality of devices, and the application is configured to communicate the at least one data input to the server; performing by the server, using the sentiment analysis machine learning model, a sentiment analysis on the at least one data input to generate sentiment information indicative of an emotional state of the user; performing by the server, using the behavior analysis machine learning model, a behavior analysis on the at least one data input to generate behavior information indicative of a behavioral state of the user; determining by the server, through a decision engine, an responsive action based on the sentiment information and the behavior information; and performing by the server the responsive action.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
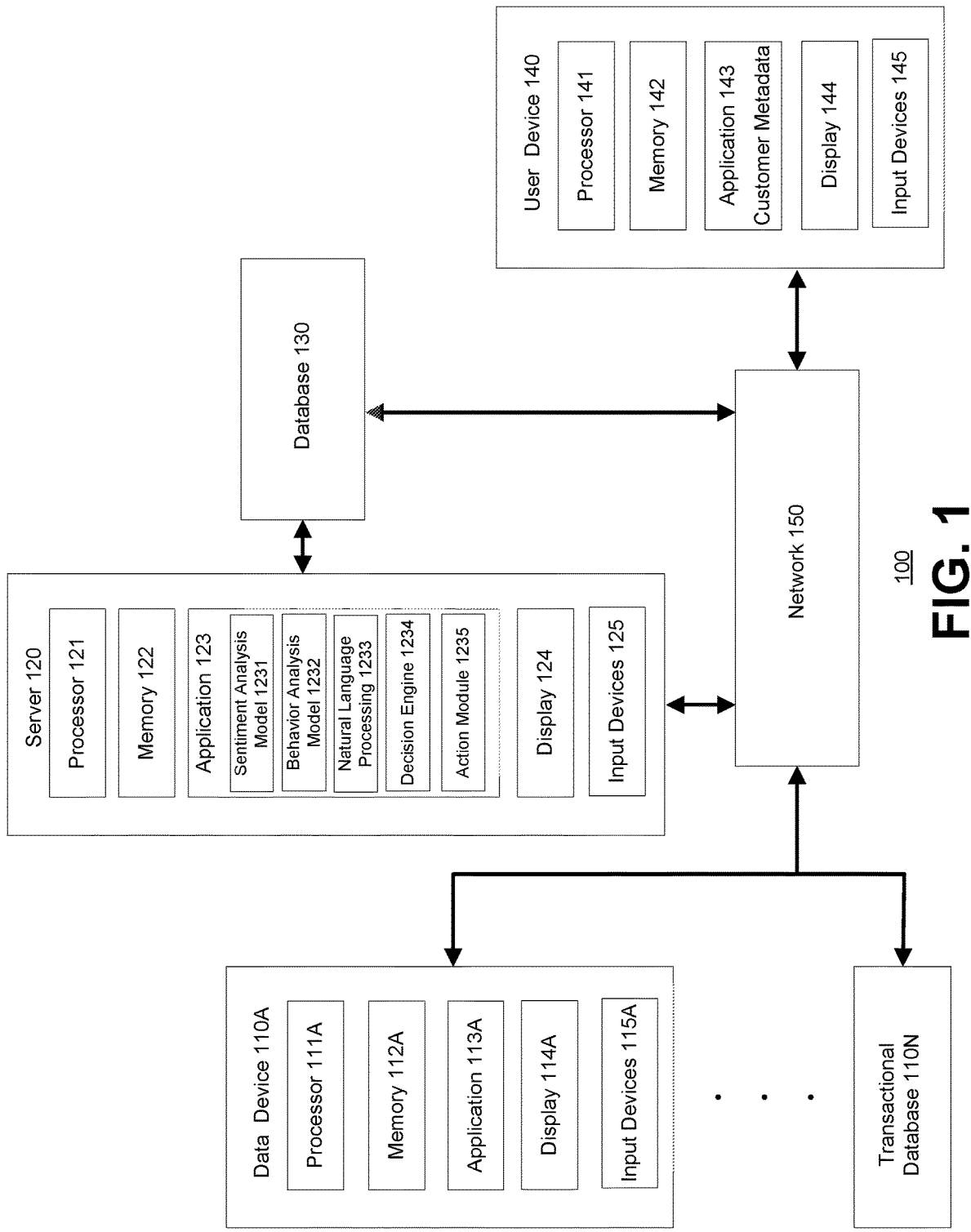
FIG. 1 is a diagram of a system for decision-making with multi-channel data inputs according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems and methods for automatically making decisions based on multi-channel data inputs using user-configured criteria. Specifically, systems and methods are provided based on multi-channel data inputs with a sentiment analysis machine learning (ML) model and behavior analysis ML model suite and customized commands. The machine learning models are trained by multi-channel data inputs. The multi-channel data inputs may include, but not limited to, geolocations, transaction data, and biometric data (e.g., facial recognition, heart rate, skin conductance changes, body temperature, and voice volume, tension, pitch and tone, etc.) In the disclosed systems and methods, the machine learning models may be configured to identify users' emotional/mental/behavioral states based on the multi-channel data inputs to make corresponding decisions, such as, triggering a recommendation, to prompt, prevent, or alert the users in response to user-configured criteria and commands. Those decisions may be implemented as customized commands such that the customized commands can be automatically executed, for example, by a computing device once identified by the user. User-configured criteria may be used to compare with the users' emotional/mental/behavioral states evaluated by the ML models to determine the recommendation/prompt/alert/action. The recommendation/prompt/alert/action can include, for example, launching a ridesharing application on a device of a user when the user is evaluated to have an angry face and irregular voice at a time after 11:00 pm local time (i.e., the user-configured criteria can be "an angry face and irregular voice plus after 11:00 pm local time" and the action could be "launch ridesharing app"), taking out money from a saving account of the user when the user is evaluated to have spent too much screen time, freezing a credit card of the user when the user is evaluated to act abnormally while shopping, and the like.

Some examples of the user-configured criteria may include "don't allow me to spend more than $50 if I'm stressed," "don't allow me to spend money on exampleweb-site.com if I'm stressed," "shut down my computer when I spend more than one hour on screen time," and the like. Since the user or legal guardian of the user best knows their own actions in various emotional and behavioral states, the user or legal guardian of the user can provide the criteria for evaluation and the actions to be taken in response to the detection of the criteria. The user or legal guardian of the user may voluntarily set the criteria and permit data collection for these purposes, and no criteria may be established, no actions may be taken, and no data may be collected without the user's agreement or agreement of the legal guardian of the user.

As described, a behavioral state and an emotional/mental state of a user are evaluated using the behavior analysis ML models and the sentiment analysis ML models based on the mulita-channel data inputs, not on a single-channel data input. The decisions (e.g., recommendation/prompt/alert/action) are determined not only based on the behavioral state and/or the emotional state evaluated by the ML models, but also based on the user-configured criteria (i.e., whether the user-configured criteria are met).

As an application example of the present disclosure, a user can be provided with a control over their own financial spending, such as a control over their shopping when the user is in an unstable emotional state. There may be a number of different ways that a user can set up their own rules around, for example, what can be spent, where, and when.

In some examples, these rule may include fraud-based rules that allow a user to enable. For example, if the user as the primary cardholder of a credit card has an authorized user on his or her account, he or she may set up a rule that the authorized user can only spend money between 8:00 a.m. and midnight. If a charge to the credit card is outside of the pre-specified time frame, then the charge is considered as invalid and would be declined. In addition to those general rules, the present disclosure can allow a user to control their spending based on their emotional state and/or behavioral state. The emotional state and/or behavioral state of the user can drive a variety of decisions that the user makes. For example, the user may have various compulsive behaviors that the user is more likely to engage in unrestricted shopping based on their emotional state.

Accordingly, the present disclosure can provide a way or medium for a user who knows these things about themselves and wants to control their spending even in those emotional states, to set up or configure such emotion/behavior-based rules (i.e., user configured criteria). For example, a user may know that when he or she is especially stressed, especially nervous, or especially tired, he or she might make poor purchasing decisions. The present disclosure can correct such compulsive and destructive financial behaviors and prevent a user's action when they are under poor emotional and/or behavioral influence. For example, transactions can be limited or controlled based on emotional state of the user, such as blocking anxiety/stress shopping, limiting specific transactions, such as items costing more than a threshold amount, financial transactions (e.g., withdrawals or funds transfers), purchasing dangerous items, and purchasing age-restricted items, and the like.

FIG. 1 illustrates a system 100 for decision-making with multi-channel data inputs according to an example embodiment. As further discussed below, the system 100 may include a plurality of data devices 110 (i.e., a data device 110A to a transactional database device 110N), a server device 120, a database 130, and a user device 140 in communication using a network 150. Although FIG. 1 illustrates single instances of the components, the system 100 may include any number of components.

The plurality of data devices 110 may include, but not limited to, an image data generation device (such as a camera, a camcorder, and the like), a voice data generation device (such as a digital microphone), a biometric data generation device (such as heart rate monitoring device, skin conductance monitoring device, body temperature device), a geolocation data generation device, a user metadata generation device (such as user data in credit card account configured by a user), a transactional data storing device (such as the transactional database 110N). The data device 110A as an example device of the plurality of data devices 110 is described herein. The data device 110A may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smartcard, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The data device 110A may include a processor 111A, a memory 112A, an application 113A, a display 114A, and input devices 115A. The processor 111A may be a processor, a microprocessor, or other processor, and the data device 110A may include one or more of these processors. The processor 111A may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111A may be coupled to the memory 112A. The memory 112A may be a read-only memory, write-once read-multiple memory or read/write memory, e.g., RAM, ROM, and EEPROM, and the data device 110A may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112A may be configured to store one or more software applications, such as application 113A, and other data, such as private and personal information.

The application 113A may comprise one or more software applications comprising instructions for execution on the data device 110A. In some examples, the data device 110A may execute one or more applications, such as software applications, that enable, for example, network communications with one or more components of the system 100, transmit and/or receive data, and perform the functions described herein such as image data generation and transmission, voice data generation and transmission, biometric data generation and transmission, geolocation data generation and transmission, user metadata generation and transmission, transactional data generation and transmission, and so forth. Upon execution by the processor 111A, the application 113A may provide the functions described in this specification, specifically to execute and perform the steps and functions in the process flows described below. Such processes may be implemented in software, such as software modules, for execution by computers or other machines. The application 113A may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

For example, the application 113 may comprise a health tracking application. Information of a user can then be aggregated from multiple health tracking applications. For example, a user may have diabetes and is prone to regularly checking his or her blood sugar. This can be tracked in automatic ways, including where the user pricks his or her finger, putting the finger on the measuring device, and inserting the measuring device into an attachment on the data device. The health tracking application on the data device can record that information for the user and store that information in a memory of the data device. The health tracking application can be third-party apps that are checking other health factors that would be impacting the user's ability to make choices as well as emotional state of the user. For instance, if the blood sugar is low, that may indicate the user is probably going to be sleepy. In addition, the user can use the options provided in the health tracking application to limit the action based on what they choose from, whereby the privacy of the user can be protected.

The data device 110A may further include a display 114A and input devices 115A. The display 114A may be any type of device for presenting visual information such as a computer monitor, a flat panel display, and a mobile device screen, including liquid crystal displays, light-emitting diode displays, plasma panels, and cathode ray tube displays. The input devices 115A may include any device for entering information into the data device 110A that is available and supported by the data device 110A, such as a touch-screen, keyboard, mouse, cursor-control device, touch-screen, microphone, digital camera, video recorder or camcorder. These devices may be used to enter information and interact with the software and other devices described herein.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's shopping and financial account information.

The application 123 may comprise one or more software applications comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the application 123 may include machine learning models such as a sentiment analysis model 1231, a behavior analysis model 1232, natural language processing (NLP) algorithms 1233 to perform voice recognition and voice-to-text conversion (e.g., to receive and process user criteria provided as a voice input), a decision engine 1234 to make decisions, and an action model 1235 to perform actions determined by the decision engine 1234. Such processes may be implemented in software, such as software modules, for execution by computers or other machines. The application 123 may provide graphic user interfaces (GUIs) through which user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store date, including without limitation, private information of users, image data, voice data, biometric data, geolocation data, user metadata, and transactional data. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The user device 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smartcard, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 140 may include a processor 141, a memory 142, and an application 143. The processor 141 may be a processor, a microprocessor, or other processor, and the user device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the user device 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 142 may be configured to store one or more software applications, such as the application 143, and other data, such as user's shopping and financial account information.

The application 143 may comprise one or more software applications comprising instructions for execution on the user device 140. In some examples, the user device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. For example, the application 143 may be executed to receive user metadata and transmit the user metadata to the server 120. The user metadata herein may include responses to the decisions made by the decision engine 1234, responses to results of the sentiment analysis model 1231, and responses to results of the behavior analysis model 1232. Such processes may be implemented in software, such as software modules, for execution by computers or other machines. The application 143 may provide graphic user interfaces (GUIs) through which user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the user device 140 that is available and supported by the user device 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the plurality of data devices 110, the server 120, the database 130, and the user device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the plurality of data devices 110, server 120, and user device 140 using network 150 can occur using one or more front channels and one or more secure back channels. A front channel may be a communication protocol that employs a publicly accessible and/or unsecured communication channel such that a communication sent to the data device 110A, server 120, and/or user device 140 may originate from any other device, whether known or unknown to the data device 110A, server 120, and/or the user device 140, if that device possesses the address (e.g., network address, Internet Protocol (IP) address) of the data device 110A, server 120, and/or the user device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the data device 110A, server 120, and/or the user device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, each of the plurality of data devices 110 can be associated with a user and may be operated by that user. The server 120 can be associated with an institution such as a financial institution. The user device 140 can be associated with a user and may be operated by that user.

Figure 2:
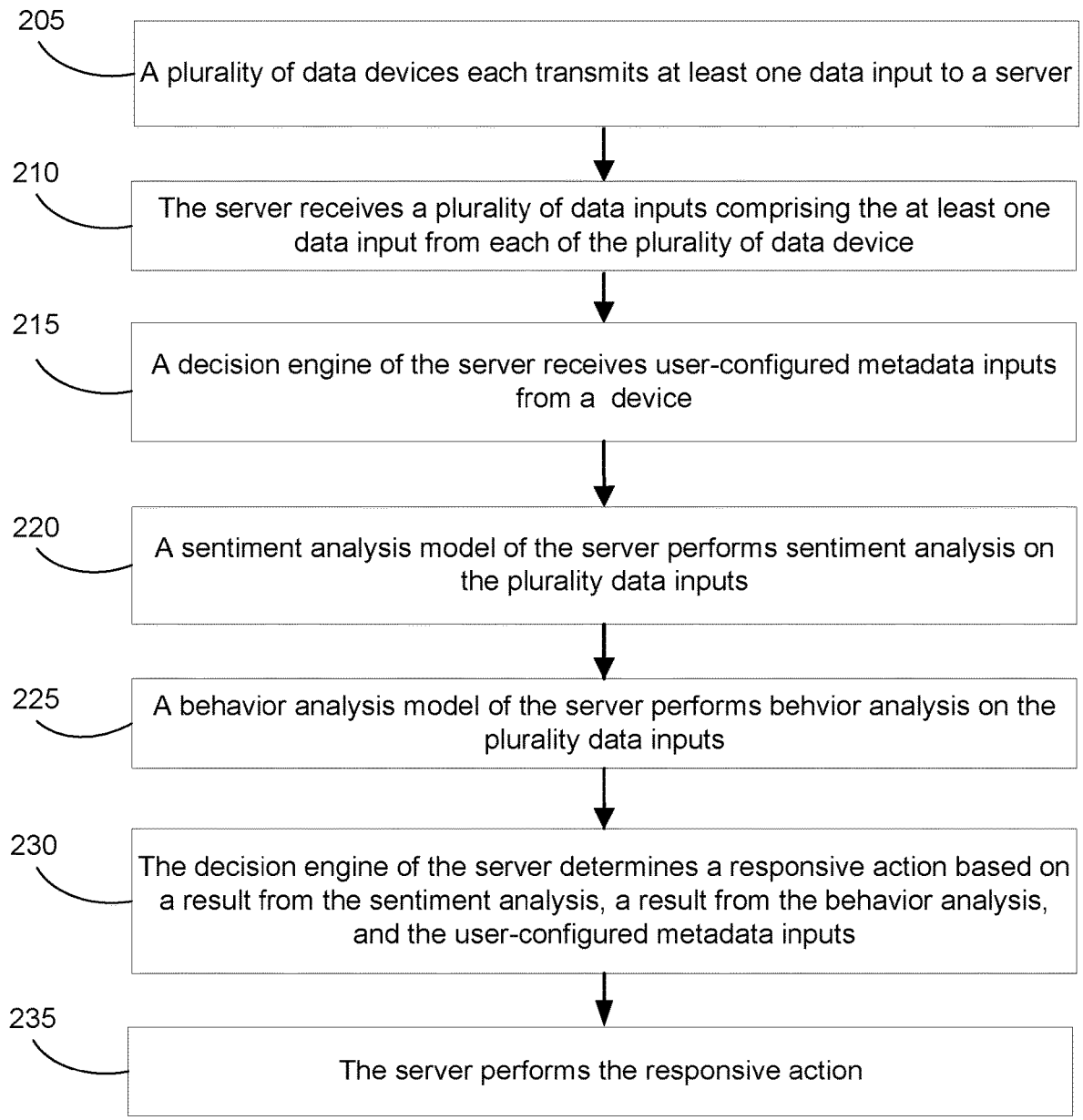
FIG. 2 is a flow chart illustrating a method of decision-making with multi-channel data inputs according to an example embodiment.

FIG. 2 illustrates a flow chart of a method 200 for making decisions using multi-channel data inputs according to an example embodiment. FIG. 2 may reference the same or similar components as those illustrated in FIG. 1, including a plurality of data device, a server, a database, and a user device. The method 200 may be implemented in the system 100 of FIG. 1 and may comprise the following steps.

In step 205, the plurality of data devices 110 may each transmit at least one data input to the server 120. The plurality of data devices 110 can generate various data, including but not limited to images (e.g., a facial picture of a user, a scanned image of a document or graphics, a photo of surroundings around the user), voices (e.g., an audio recording of the user about themselves, an audio recording of the user about their surroundings), videos (e.g., a video clip of the user, a video clip of an event shot by the user), geolocation (e.g., a location of the user identified by a global positioning system), biometric data (e.g., a heart rate of the user, a blood pressure of the user, a body temperature of the user, a skin conductance of the user), and transactional data (e.g., purchasing history of the user). The plurality of data devices 110 can transmit the generated various data to the server 120. The plurality of data device 110 may include, but not limited to, an Apple® watch, Samsung® watch, Fitbit® device, an Amazon® Alexa, a smart phone, a camera, a camcorder, a microphone, an optical character recognition device, a transactional data store device, a body temperature scanner, a skin conductance device, a facial recognition device, a heart rate monitor, a blood pressure measurement device, a glucose monitoring and measurement device, a blood sugar measurement device, and the like. The various data may be generated and transmitted by means of corresponding software applications installed on each data device, such as the application 113A on the data device 110A. The biometric data may be collected during physical movements of the data device 110A via connective apparel, such as sensor embedding clothing, etc. Exemplary biometric data includes, without limitation, the user's heart rate, the user's blood pressure, the user's a body temperature, the user's skin conductance, the user's blood sugar levels, the user's glucose levels, the user's facial gestures, and the user's body gestures, collected at a single point or over a period of time.

The plurality of data devices 110 may be third party devices and store the various data separately, without aggregating the data for a long period of time. For example, the various data may only be stored for a finite period of time (e.g., six months or less). Since this is a voluntary, opt in program for users, users can opt out and opt in for data collection whenever they desire. If a user opts out, all collected data for that user may be deleted.

In step 210, the server 120 receives a plurality of data inputs comprising the at least one data input from each of the plurality of data devices 110. Upon receiving the plurality of data inputs (i.e., the various data), the server 120 may store the various data in the database 130. The various data may be communicated between the plurality of data devices 110 and the server 120 through one or more secure back channels of the network 150. The various data may also be communicated between the plurality of data devices 110 and the database 130 through one or more front channels. The various data may further be encrypted during the communications between the plurality of data devices 110 and the server 130 for further data security and confidentiality.

In step 215, the decision engine 1234 of the server 120 may receive user-configured metadata inputs from a device. The user-configured metadata may be received from one or more the plurality of data devices 110. The user-configured metadata may also be received from the user device 140. The user-configured metadata may comprise the user-configured criteria, such as getting rewarded $1 towards a recreational entertainment fund or new phone fund of the user from a bank with which the user opens a checking or saving account when the user is detected by the bank to laugh at a camera, calling a family member when the user is detected yelling "kimchi fried 101", freezing a credit card of the user when the user says "I am not angry" plus detection of irregular voice of the user, and the like.

In step 220, the sentiment analysis ML model 1231 of the server 120 performs a sentiment analysis on the plurality data inputs. As used herein, the ML model may be any suitable ML models or algorithms to process and analyze the plurality of data inputs. The various ML models may comprise supervised learning (e.g., classification and regression), unsupervised learning (e.g., pattern recolonization and cluster analysis), semi-supervised learning, reinforcement learning, self-learning, feature learning (e.g., sparse dictionary learning), associate rules and anomaly detection. The various ML models can utilize various neural network, such as convolutional neural networks ("CNNs") or recurrent neural networks ("RNNs"). A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features. A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

The sentiment analysis ML model 1231 of the server 120 may process and analyze the plurality of data inputs to generate a result comprising sentiment information indicative of a sentimental state of the user. The result (an emotional state) may be represented as a multi-component vector that comprises, for example, a stress level component, a blood pressure level component, a heat beat rate component, a facial expression level component, a voice tension level, and the like. That is, the emotional state is determined based on a combination of data inputs, for example, including words that the user says, words that the user types, a type of way that the body temperature is taken (e.g., whether fingers or mouth of the user), non-verbal cues, and so forth. Further, the way the user speaks words may also be taken into account and analyzed by the sentiment analysis ML model. For example, when saying "happy birthday", the user can be genuine and meaningful with that, or the user can say "happy birthday" (the exact same words) and be unfriendly with that. These are both valid ways of saying it, but they have completely different meanings. Thus, the sentimental analysis ML model not only captures the actual syntax of the words, but also how the words are spoken (e.g., how the user's body is reacting during that time). This can be an indicator of a stress level component of the emotional state. For instance, the way the user speaks may indicate that the user has an increased heart rate.

For example, the sentiment analysis ML model may analyze the different ways of saying words by the user. The way of how the user normally speaks may be collected from a listening device like an Amazon® Alexa. Based on the normal way of how the user speaks, the voice data inputs of the user from the plurality of data devices 110 can be analyzed to determine, for example, whether the user has their voice volume increased, whether the user has their pace of saying each word increased or decreased, whether the user is giving really short, quick answers because the user might be angry, frustrated, and/or tired of answering these questions, whether the user has a lot of time between the words because the user might be stressed or frustrated, trying to get everything taken care of as quickly as possible, and just running through the words quickly, and so forth. These can be all different variations of how the user can change their means of speaking and means of communicating that indicate different things about the user.

The sentiment analysis ML model may be trained on the user's specific speaking habits and speaking patterns. Based on the training, voice anomalies of the user can be detected, for example, whether the user is speaking faster, whether the user is speaking each word faster, whether the user is speaking in a higher volume, etc. which can be used to determine a stress level of the user.

In step 225, the behavior analysis ML model 1232 of the server 120 performs a behavior analysis on the plurality data inputs. As used herein, the behavior analysis ML model may be any suitable ML models or algorithms to process and analyze the plurality of data inputs, as described above with respect to the sentiment analysis ML model 1231. The behavior analysis ML model 1232 of the server 120 may process and analyze the plurality of data inputs to generate a result comprising behavior information indicative of a behavioral state of the user. The result (a behavior state) may be represented as a multi-component vector that comprises, for example, a walk pattern component, a talk pattern component, a sweating level component, an action component, and the like. That is, the behavior state is determined based on a combination of data inputs, for example, including an image showing walking pattern of the user (e.g., staggering, sprinting, or bending), a video clip showing the user is sweating heavily, an audio clip showing how the user is talking (e.g., talking fast, or stuttering), what action the user is doing (e.g., riding a bicycle, driving a car, or using a computer or cell phone), the past transactions the user made (e.g., what products the user purchased, from which merchants, at what times the purchases were made, at which locations or which websites the purchases were made), and the like.

For example, the behavior analysis ML model may analyze a face image of the user. The normal face image of the user may be collected from an imaging device like a smartphone camera or a webcam on a computer. Based on the normal face image of the user, the image data inputs of the user from the plurality of data devices 110 (e.g., an ATM camera of a bank where the user is withdrawing some money) can be analyzed to determine, for example, whether the user's face is more angry, whether the user's face is more flushed, whether the user's face is sweating, and the like. These may be inadvertent biological functions. For example, the user might be more flushed because the user is angry. Environmental factors may also be taken into consideration. For example, the user might be more flushed because simply the weather is hot. If the ATM that is outside having a camera capturing that the user is flushed or sweaty, then the behavior analysis ML model can be able to also look up what the weather is at that location, such that a more accurate decision can be made that the user is flushed because it is 95° F. outside.

In step 230, the decision engine 1234 of the server 120 determines a responsive action based on the result from the sentiment analysis, the result from the behavior analysis, and the user-configured metadata inputs. The decision engine 1234 analyzes and evaluates one or more components of the emotional state produced from the sentiment analysis ML model 1231 and the behavioral state produced from the behavior analysis ML model 1232 again the corresponding user-configured metadata inputs to make a decision and determine a responsive action based on the decision. For example, when the temperature component of the emotional state is higher than the temperature value of the user-configured metadata inputs the skin inductance of the emotional state is higher than the skin inductance value of the user-configured metadata inputs, and the blood pressure component of the emotional state is higher than the blood pressure component of the emotional state, the decision engine 1234 makes a decision that the user-configured criteria is met. The user-configured metadata input may specify an action associated with the user-configured criteria. Accordingly, the decision engine 1234 would determine the response action when the user-configured criteria is met. For example, the user-configured metadata may indicate that when the user-configured criteria is met, a doctor is called. Thus, the decision engine may produce an action to call the doctor.

As another example, if the user wears an Apple® watch, a Fitbit®, or one of the higher-end health monitors or health wearables that can be configured to report, for example, the body temperature of the user, the heart rate of the user, and/or the blood sugar of the user, to a financial institution with which the user is associated, the user may also being imaged engaging at an ATM at the financial institution. For instance, The ATM may have a camera installed that are able to capture what the user's face is (e.g., sweating), and/or what the facial expression of the user is (e.g., nervous or happy). When those multi-channel data inputs are processed and analyzed by the sentiment analysis ML model 1231 and the behavior analysis ML model 1232 to produce an emotional state and a behavioral state of the user, respectively, one or more components of the emotional state and/or the behavioral state may meet the corresponding data thresholds of the user-configured criteria, however, other data thresholds of the user-configured criteria may not be met. For example, the heart rate component of the emotional state may indicate that the heart rate of the user is greater than the heat rate threshold of the user-configured criteria, but the face component of the behavioral state may indicate that the user is laughing and thus has a nervousness component being lower than the nervousness threshold of the user-configured criteria. Alternatively, the increase in the heart rate could be because the user just went running or just finished their exercise. Accordingly, the decision engine 1234 may make a decision that the user-configured criteria is not met, which would not trigger a response action. Thus, the present disclosure provides a system that can make a decision more accurately using multi-channel data inputs, whereby prevent improper actions from being taken. For example, if a single-channel data is used (e.g., a heart rate input), the ML model and the decision engine may produce an action to freeze a credit card of the user if the user's heart rate produced from the ML model is greater than the heart rate threshold of the user-configured criteria. However, with the present disclosure, even though the heart rate produced from the ML model is greater than the heart rate of the user-configured criteria, the decision engine may not produce an action to free the credit card of the user because the nervousness level component of the behavioral state is lower than the nervousness threshold of the user-configured criteria due to the laughter of the user captured by the ATM camera. That is, the fast heart rate produced by the ML model may be due to the laughter of the user, not because of other adverse things.

For another example, the ML models may determine that the user is flushed, but also note that the voice intonation of the user is different in how the user is saying words. That combination of things can indicate the stress level of the user. It might be both the actual syntax of the words the user says and that the user is flushed. As still another example, the retinas of the user may be detected from a face image of the user to determine whether the user is angry or nervous or stressed, along with whether the voice of the user is normal, the user can be determined if he or she is making a rational decision when he or she is angry and start yelling. Thus, the present disclosure can use multiple pieces of information to get a better view of a current emotional state of the user.

In step 235, the server 20 performs the responsive action. The responsive action may be an action corresponding to the user-configured criteria. For example, the action may be to award the user $1 by a bank with which the user has a financial account when the user configures the user-configured criteria in the bank as "get $1 (recreational entertainment fund/new phone fund) when laughing to the camera". So when the decision engine 1234 makes a decision that the user-configured criteria is met (i.e., the user is determined to be laughing at a camera), the server 120 can perform the responsive action to transfer $1 to the financial account of the user. The server 120 may perform the responsive action through the action module 1235 of the application 123 on the server 120. Another example of the responsive action may be an action that takes out $1 from a first bank account of the user and moves to a second bank account of the user when the user configures the user-configured criteria in the bank as "take out $1 from saving and move to other account when too much screen time is spent". So when the decision engine 1234 makes a decision that the user-configured criteria is met (i.e., the user is determined to spend screen time greater than a screen time threshold), the server 120 can perform the responsive action to take out $1 from the first bank account and move it to the second bank account of the user. Also for example, when the user is determined to be happy while eating at a restaurant, the action may be to automatically tip the waiter/waitress with a higher amount. Further, when the user is determined to have unusual behaviors such as walking in an unbalanced manner (e.g., from a motion sensor) and/or an elevated heart rate, the action may be to automatically call a doctor or an ambulance for the user because the user may be in a stroke. The action may also be to send an alert to the user to notify the user of his or her current emotional state and/or behavioral state. The action may further include notifying a law enforcement officer, calling a taxi, or donating money. For all these action examples, the user can pre-configured the system to add user metadata related to the actions, that is, the user-configured criteria. When the criteria is met, the corresponding action would be performed.

In some embodiments, the server 120 may be further configured to pre-process the at least one data input before the at least one data input is fed into the sentiment analysis ML model, the behavior analysis ML model and/or the decision engine. The pre-processing may include reformatting the at least one data input. For example, the at least one data input received from one of the plurality of data devices 110 may be represented in a first data structure, and the ML models may take data represented in a second data structure which is different than the first data structure. The server 120 may then transform the first data structure into the second data structure that can be taken by the ML models.

In some embodiments, the server 120 may further comprise a natural language processing (NLP) model configured to process voice data or text data received from the plurality of data devices 110. For example, a NLP model 1233 may be incorporated into the application 123 on the server 120. The processed voice data or text data is transmitted to the sentiment analysis ML model 1231, the behavior analysis ML model 1232, and/or the decision engine 1234 for further processing. The NLP may use speech-to-text algorithms to extract text messages from a voice file. The NLP may use speech recognition and speech segmentation algorithms to analyze the voices of the user to extract information about, for example, voice pitch, voice accent, speaking style, voice volume magnitude, speaking tone/intonation, speech tension level, and speaking frequency. Various technologies can be used by the NPL including, but not limited to, speech frequency estimation, hidden Markov models, Gaussian mixture models, pattern matching algorithms, neural networks, matrix representation, vector quantization and decision trees.

In some embodiments, the optical character recognition (OCR) may be used to process images of typed, handwritten or printed text into machine-encoded text. Those images generated by the plurality of data devices 110 may include a scanned document, a photo of a document, a scene-photo (for example the text on signs and billboards in a landscape photo) or subtitle text superimposed on an image. For example, those images may be images of passport documents, invoices, bank statements, computerized receipts, business cards, mail, printouts of static-data, or any suitable documentation.

In some embodiments, facial recognition technologies may be used to analyze facial expressions (e.g., happy, angry, crying, sweating, frustration and the like) of a user from a digital image or a video frame generated by one or more of the plurality of data devices 110. Facial recognition technologies used herein may include feature extraction, skin texture analysis, and 3-dimensional facial recognition. The facial recognition technologies may also be used herein to process a photo identification of a user to identify or verify the user presented on the photo identification. For example, the user may use one of the plurality of data devices 110 to scan or capture an image of the photo identification, which may later be processed using the facial recognition technologies.

In some embodiments, the action model may be deployed on a different device or server than the sentiment analysis ML model, the behavior analysis ML model, and/or the decision engine. For example, the sentiment analysis ML model, the behavior analysis ML model, and/or the decision engine may be deployed on a server (e.g., the server 120 in FIG. 1), while the action model is deployed on a third party device or on a customer financial account server associated with a third party financial institution. The server can receive the multi-channel data inputs from the plurality of data devices. The server can perform a sentiment analysis on the multi-channel data using the sentiment analysis ML model, a behavior analysis on the multi-channel data using the behavior analysis ML model, and/or make a decision using the decision engine. The server can transmit an action command based on the decision to the customer financial account server associated with the third party financial institution. The customer financial account server associated with the third party financial institution can perform the action according to the action command. Alternatively, the server may also transmit an emotional state determined from the sentiment analysis ML model and/or a behavior state derived from the behavior analysis ML to the customer financial account server associated the third party financial institution. The decision engine which may be deployed on the customer financial account server associated with the third party financial institution can make a decision based on the emotional state and the behavioral state, and perform a responsive action according to the decision. In these embodiments, user consent may be required to protect user identity, for example, by anonymizing data or otherwise concealing an individual user's identity, such that the third party financial institution is not able to track back to individual users via the ML output data from the server.

Figure 3:
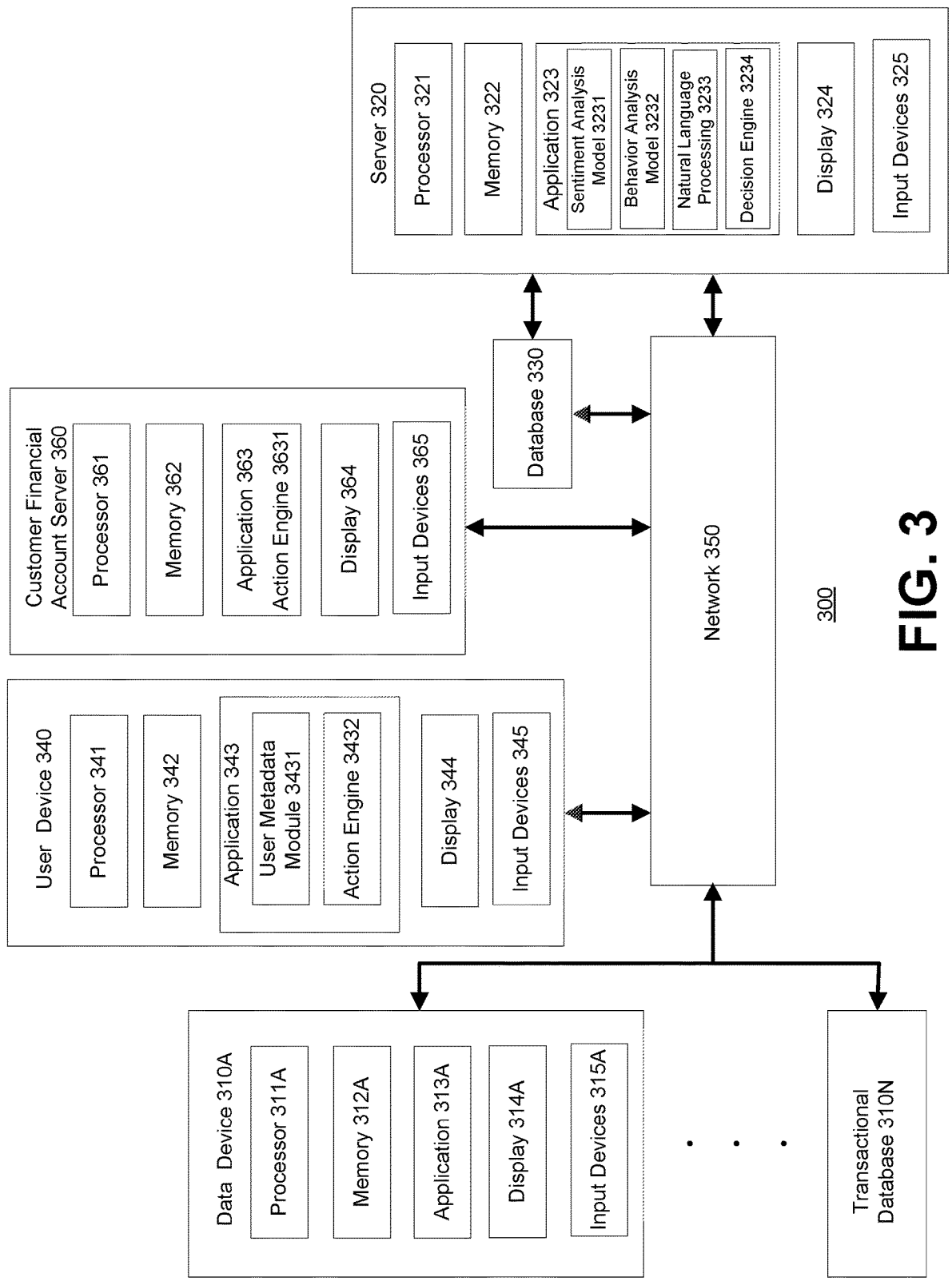
FIG. 3 is a diagram of a system for decision-making with multi-channel data inputs according to an example embodiment.

FIG. 3 illustrates a system 300 for decision-making with multi-channel data inputs according to an example embodiment. The system 300 may include a plurality of data devices 310 (i.e., a data device 310A to a transactional database device 310N), a server device 320, a database 330, a user device 340, and a customer financial account server 360 in communication using a network 350. The customer financial account server 360 may be owned or associated with a third party financial institution. In the system 300, the sentiment analysis ML model, the behavior analysis ML model, and the decision engine are deployed on the server 320, whereas the action engine or model is deployed on the user device 340 and the customer financial account server 360. Alternatively, the decision engine can also be deployed on the user device 340 and the customer financial account server 360. Although FIG. 3 illustrates single instances of the components, the system 300 may include any number of components.

The plurality of data devices 310, like the plurality of data devices 110 in FIG. 1, may include, but not limited to, an image data generation device (such as a camera, a camcorder, and the like), a voice data generation device (such as a digital microphone), a biometric data generation device (such as heart rate monitoring device, skin conductance monitoring device, body temperature device), a geolocation data generation device, a user metadata generation device (such as user data in credit card account configured by a user), a transactional data storing device (such as the transactional database 310N).

The data device 310A as an example device of the plurality of data devices 310 is described herein. Similar to the data device 110A, the server 120, and the user device 140 in the FIG. 1, the data device 310A, the server 320, the user device 340 and the customer financial account server 360 in FIG. 3 may each be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The data device 310A may include a processor 311A, a memory 312A, an application 313A, a display 314A, and input devices 315A. Those components of the data device 310A are the same as or similar to the components of the data device 110A in FIG. 1 in terms of functions and structures, which are not repeated herein.

The server 320 may include a processor 321, a memory 322, an application 323, a display 324, and input devices 325. The application 322 may comprise a sentiment analysis model 3231, a behavior analysis model 3232, a NPL 3233, and a decision engine 3234. Those components of the server 320 are the same as or similar to the components of the server 120 in FIG. 1 in terms of functions and structures, which are not repeated herein.

The user device 340 may include a processor 341, a memory 342, an application 343, a display 344, and input devices 345. The application 343 may comprise a user metadata module 3431 and an action engine 3432. Those components of the user device 340 are the same as or similar to the components of the user device 140 in FIG. 1 in terms of functions and structures, which are not repeated herein.

The database 330 and the one or more networks 350 are the same as or similar to the database 130 and the one or more networks 150 in FIG. 1 in terms of functions and structures, which are not repeated herein.

The customer financial account server 360 include a processor 361, a memory 362, an application 363, a display 364, and input devices 365. The application 363 may comprise an action engine 3631. Those components of the server 360 are the same as or similar to the components of the server 120 in FIG. 1 in terms of functions and structures, which are not repeated herein.

In some examples, each of the plurality of data devices 310 can be associated with a user and may be operated by that user. The user device 140 can be associated with a user and may be operated by that user.

Figure 4:
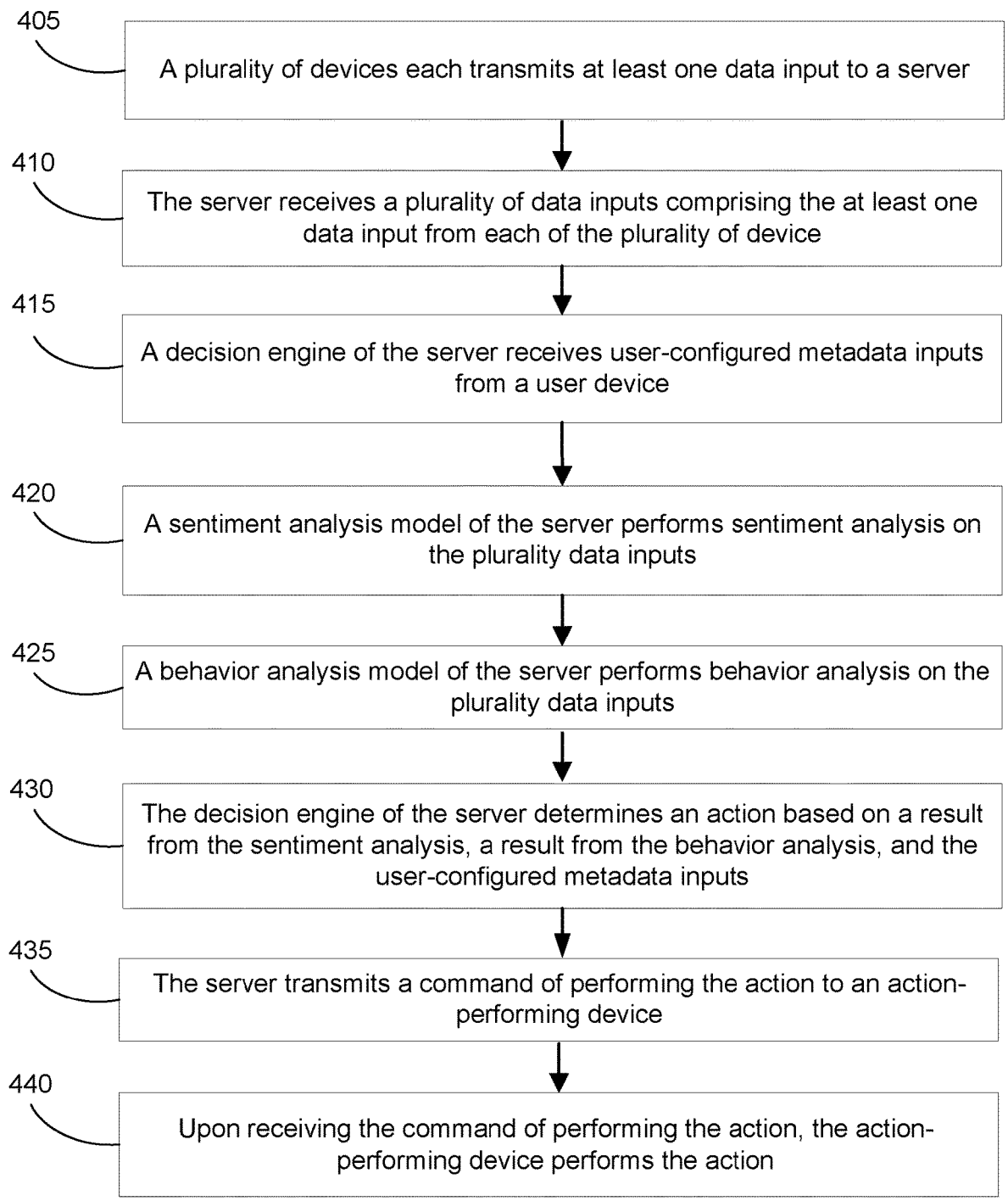
FIG. 4 is a flow chart illustrating a method of decision-making with multi-channel data inputs according to an example embodiment.

FIG. 4 illustrates a flow chart of a method 400 for making decisions using multi-channel data inputs according to an example embodiment. FIG. 4 may reference the same or similar components as those illustrated in FIGS. 1-3, including a plurality of data device, a server, a database, a user device and a customer financial account server. The method 400 may be implemented in the system 300 of FIG. 3 and may comprise the following steps.

In step 405, the plurality of devices 310 may each transmit at least one data input to the server 320. The at least one data input from each of the plurality devices 310 may form various data inputs, as described in step 205 of the method 200. The plurality of devices 310 may comprise a device capable of generating image data, a device cable of generating voice data, a device capable of generating biometric data, a device capable of generating geolocation data, a device capable of storing transactional data, a device capable of generating text data, and a device capable of receiving user metadata. The biometric data may comprise a heart rate, a pulse rate, a body temperature, a skin conductance change, a blood pressure level, and a blood sugar level.

In step 410, the server 320 receives a plurality of data inputs comprising the at least one data input from each of the plurality of data device 310. In step 415, the decision engine 3234 of the application 323 of the server 320 receives user-configured metadata inputs from the user device 340 through the user metadata module 3431 or one or more of the plurality of data devices 310. In step 420, the sentiment analysis model 3231 of the application 323 of the server 320 performs a sentiment analysis on the plurality data inputs. In step 425, the behavior analysis model 3232 of the application 322 of the server 320 performs a behavior analysis on the plurality data inputs. In step 430, the decision engine 3234 of the application 323 of the server 320 determines an action based on a result from the sentiment analysis, a result from the behavior analysis, and the user-configured metadata inputs. The above steps 405-430 are similar to the steps 205-230 of the method 200, respectively. Details of those steps are not repeated herein.

The user-configured metadata inputs may comprise user-preconfigured criteria, including, for example, a time later than a specified time threshold, an emotional stress level greater than a specified emotional stress level threshold, a blood pressure higher than a specified blood pressure threshold, a voice pitch higher than a specified voice pitch threshold, a speaking speed faster than a specified speaking speed threshold, and a sweating amount greater than a specified sweating amount threshold, and so forth.

As described in the system 300 in which the method 400 may be implemented, the server 320 may be a server that is used to receive the multi-channel data inputs and perform the sentiment analysis and a behavior analysis to make a decision based on which a responsive action is determined or recommended. The server 320, however, does not perform the action.

In step 435, the server may transmit a command of performing the action to an action-performing device. As illustrated in the system 300 in FIG. 3, the action performing device may be the user device 340 and/or the customer financial account server 360.

In step 440, upon receiving the command of performing the action, the action-performing device performs the action. For example, if the action is to call a family member of the user, the server 320 may transmit the command to the user device 340. Upon receiving the command, the user device 340 may be triggered to call a family member of the user through the action engine 3432. For example, the action engine 3432 may automatically locate the contact number of a family member of the user in the contact book saved on the user device 340 and dial the contact number. If the action is to call ridesharing for the user, the action engine 3432 may automatically launch the ridesharing app installed on the user device 340 to call a ride for the user. Similarly the customer financial account server 360 may receive a command from the server 320 to perform an action. For example, if the action is to decline a transaction of the user, the customer financial account server 360 may perform the action to block the transaction or freeze a credit card of the user involved in the transaction.

In addition, the decision engine 3234 may be deployed on the user device 340 and the customer financial account server 360 instead of being deployed on the server 320. In such scenario, the user device 340 and the customer financial account server 360 may receive the result of the sentiment analysis, the result of the behavior analysis, and the user-configured criteria from the server 320. The user device 340 and the customer financial account server 360 can make respective decisions and perform respective actions.

Herein some examples are described to further illustrate the system 300 and the method 400. For example, a user may have a Google® Home and/or Amazon® Alexa. Those data devices may be able to capture voices and conversations by listening to the user who is both engaging with it as well as engaging with other people in the room. The user may also wear a Fitbit® device, and other data devices. The various data captured by those data devices can be transmitted to the server 320. The server 320 combines the different pieces of information to perform a sentiment analysis and a behavior analysis of the user. The server 320 may be able to report to the financial institution results of the sentiment analysis and the behavior analysis. For example, the server 320 may report that the user seems to be having a heightened stress level at time (e.g., 3:15 in the afternoon on Wednesday). The customer financial account server 360 of the financial institution may determine that the heightened stress level is greater than a stress level threshold in the user-configured criteria. The customer financial account server 360 can then decline the charges either for the next 30 minutes or until the financial institution gets a report back from the server 320 that that heightened stress level has decreased.

The server 320 may further comprise a natural language processing (NLP) model 3233 configured to process voice data or text data received from the plurality of data devices 310. And accordingly, the method 400 may comprise steps of processing data using the NPL model 3233.

As described above, the multi-channel data inputs may be communicated directly from the plurality of data devices to the server where the sentiment analysis and the behavior analysis are performed on the multi-channel data inputs. However, in some embodiments, the data inputs of each of the plurality of data devices may be first communicated to a corresponding data store, for example, a database associated with the manufacturer of the data device. For example, an iPhone® can consume Fitbit® information in a Health app installed on the iPhone® and that Health app data can then be passed on to a database associated with the iPhone®. The multi-channel data inputs can then be communicated from each corresponding data store to the server where the sentiment analysis and the behavior analysis are performed on the multi-channel data inputs.

Figure 5:
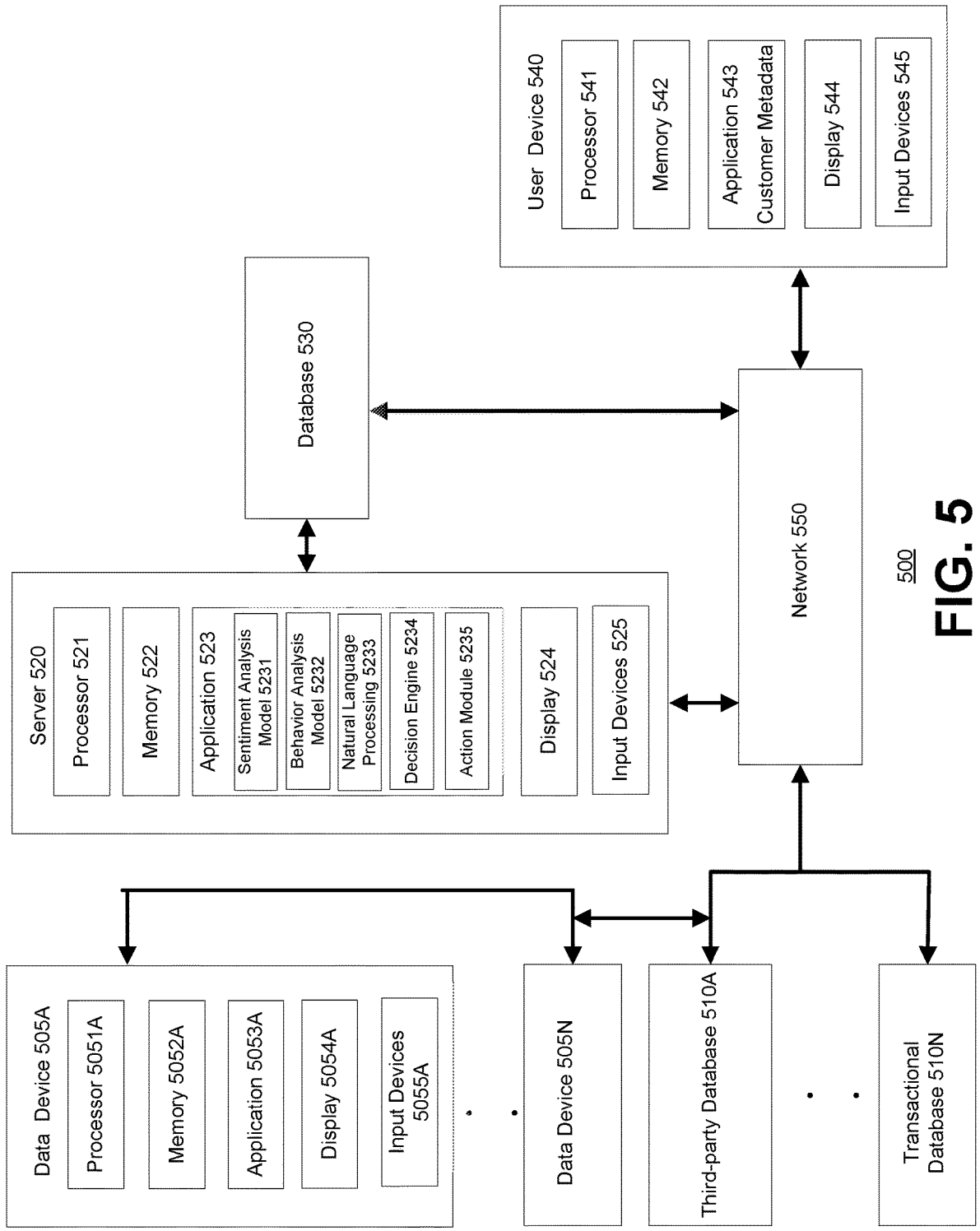
FIG. 5 is a diagram of a system for decision-making with multi-channel data inputs according to an example embodiment.

FIG. 5 illustrates a system 500 for decision-making with multi-channel data inputs according to an example embodiment. The system 500 may include a plurality of data devices 505 (i.e., a data device 505A to a data device 505N), a plurality of third-party database 510 (i.e., a third-party database 510A to a transactional database 510N), a server device 520, a database 530, and a user device 540 in communication using a network 550. The server 520 may be owned or associated with a financial institution, and the plurality of third-party database 510 may be third-party database with respect to the financial institution. The transactional database 510N storing merchant category codes may be a database associated with the financial institution.

In system 500, an example 505A of the plurality of data devices 505 may include a processor 5051A, a memory 5052A, an application 5053A, a display 5054A, and input devices 5055A. The server 520 may include a processor 521, a memory 522, an application 523, a display 524, and input devices 525. The application 523 may comprise a sentiment analysis ML model 5231, a behavior analysis ML model 5232, a NPL module 5233, a decision engine 5234 and an action module 5235. The server 540 may include a processor 541, a memory 542, an application 543, a display 544, and input devices 545. Although FIG. 5 illustrates single instances of the components, the system 500 may include any number of components. The plurality of data devices 505A, the server 520, the database 530, the user device 540 and the network 550 can be same as or similar to the plurality of data devices 110, the server 120, the database 130, the user device 140 and the network 150 in FIG. 1, respectively, details of the functions and structural components of which are not repeated herein.

Each of a plurality of third-party databases 510 may be one or more databases configured to store date, including without limitation, private information of users, image data, voice data, biometric data, geolocation data, user metadata, and transactional data. Each of the plurality of third-party databases 510 may comprise a relational database, a non-relational database, or other database implementations, and any combination thereof, including a plurality of relational databases and non-relational databases. In some examples, each of the plurality of third-party databases 510 may comprise a desktop database, a mobile database, or an in-memory database. Each of the plurality of third-party databases 510 may be in data communication with one or more corresponding data devices 505 through application programming interface (API) of the third-party database. Each of the plurality of third-party databases 510 may also be in data communication with the server 520 through the API of the third-party database.

Figure 6:
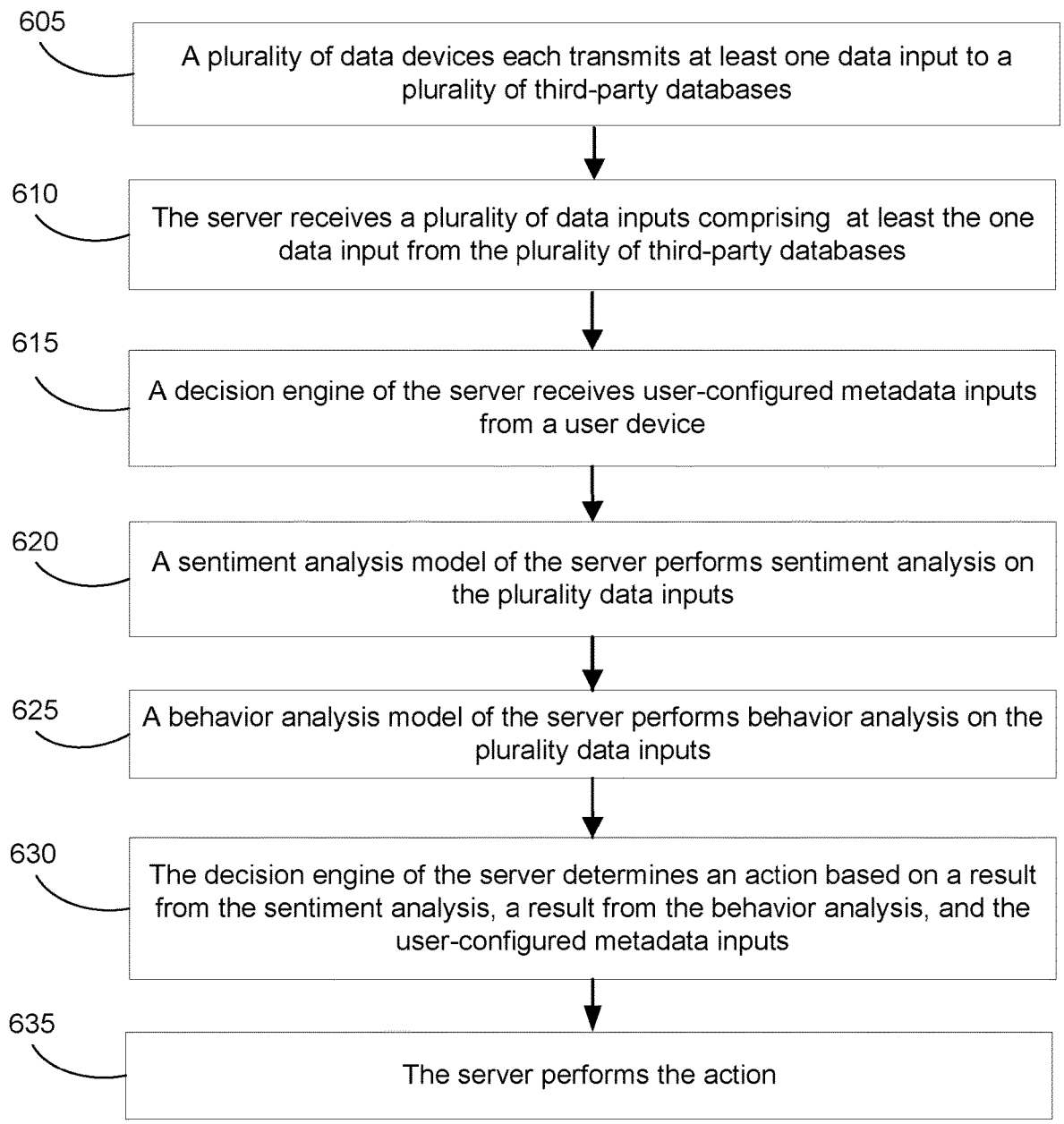
FIG. 6 is a flow chart illustrating a method of decision-making with multi-channel data inputs according to an example embodiment.

FIG. 6 illustrates a flow chart of a method 600 for making decisions using multi-channel data inputs according to an example embodiment. FIG. 6 may reference the same or similar components as those illustrated in FIGS. 1-5, including a plurality of data device, a plurality of third-party database, a server, a database, and a user device. The method 600 may be implemented in the system 500 of FIG. 5 and may comprise the following steps.

In step 605, the plurality of data devices 505 each transmits at least one data input to the plurality of third-party databases 510, respectively. For example, a Google® home may communicate its captured data (e.g., voice, conversation) to a database associated with Google®; an Amazon® Alex (e.g., speaking, yelling, calling) may communicate its captured data to a database associated with Amazon®; a Samsung® smart phone may communicate its captured data (e.g., pictures, text messages, video clips) to a database associated with Samsung®; a Fitbit® device may communicate its captured data (e.g., heart rate, pulse, blood pressure, number of steps walked or climbed, quality of sleep) to a database associated with Fitbit®; a ATM video camera may communicate its captured data (e.g., face image of a user, surrounding image) to a database associated with a bank, and the like.

In step 610, the server 520 receives a plurality of data inputs comprising at least the one data input from the plurality of third-party databases 510. Unlike the sever 120 in FIG. 1 where the server 120 receives the plurality of data inputs directly from the plurality of data device 110, the server 520 receives the plurality of data inputs from the plurality of third-party databases 510, for example, the database associated with Amazon®, the database associated with Google®, the database associated with Fitbit®, the database associated with the bank, and the like. The plurality of data may be preprocessed in the plurality of databases 510 before being communicated to the server 520.

In step 615, the decision engine 5234 of the server 520 receives user-configured metadata inputs from a user device 540. In step 620, the sentiment analysis model 5231 of the server 520 performs a sentiment analysis on the plurality data inputs. In step 625, the behavior analysis model 5232 of the server 520 performs a behavior analysis on the plurality data inputs. In step 630, the decision engine 5234 of the server 520 determines an action based on a result from the sentiment analysis, a result from the behavior analysis, and the user-configured metadata inputs. In step 635, the server 520 performs the action. The steps 615-635 are similar to the steps 215-235 of the method 200, details of which are not repeated.

The sentiment analysis ML model may be trained using labeled or unlabeled data collected from the plurality of data devices. For example, the data can be labeled to indicate at which point the user is stressed, at which point the user is not stressed, at which point the user is working out, and so forth. The sentiment analysis model can be trained to categorize whether or not the user is working out, the user is stressed, and/or the user is in a normal state.

Figure 7:
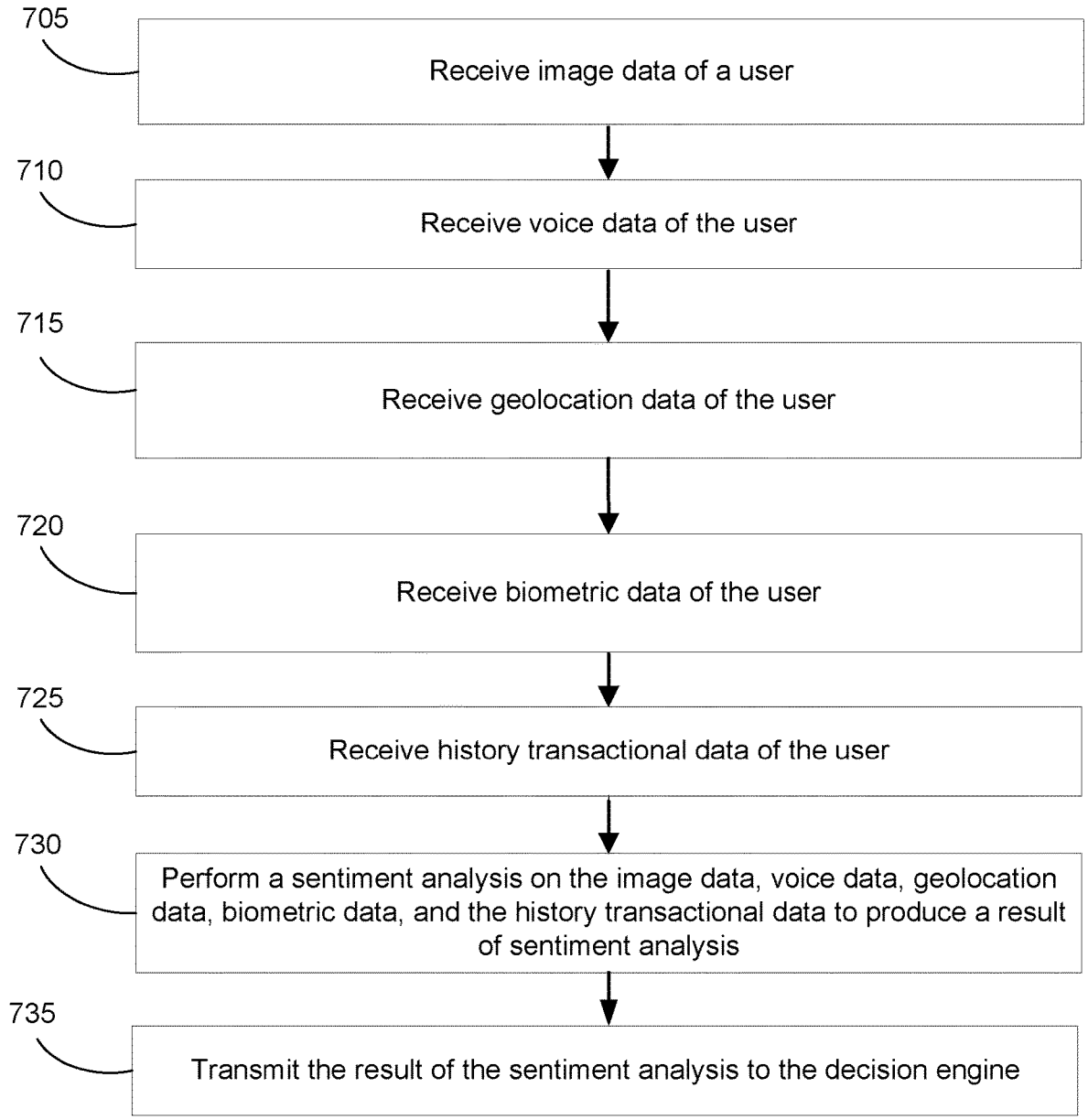
FIG. 7 is a flow chart illustrating a process of performing a sentiment analysis according to an example embodiment.

The sentiment analysis ML model is then used to perform sentiment analysis on the multi-channel data inputs. FIG. 7 illustrates a flow chart of a method 700 for performing sentiment analysis by the sentiment analysis ML model on multi-channel data inputs according to an example embodiment. FIG. 7 may reference the same or similar components as those illustrated in FIGS. 1-6, including a plurality of data devices, a server, a database, and a user device. The method 700 may be implemented in the system 100 of FIG. 1, the system 300 of FIG. 3 and/or the system 500 of FIG. 5 and may comprise the following steps.

In step 705, the sentiment analysis ML model receives image data of a user. The image data may be received from the plurality of data devices. The image data may include but not limited to face image of the user, walking image of the user, dining image of the user, shopping image of the user, driving image of the user, and the like.

In step 710, the sentiment analysis ML model receives voice data of the user. The voice data may be received from the plurality of data devices. The voice data may include, but not limited to, conversation of the user, speech of the user, presentation of the user, phone calling of the user, yelling of the user, crying of the user, and the like.

In step 715, the sentiment analysis ML model receives geolocation data of the user. The geolocation data may be received from the plurality of data devices. The geolocation data may include, but not limited to, GPS data, user-provided location data, location image, and the like.

In step 720, the sentiment analysis ML model receives biometric data of the user. The biometric data may be received from the plurality of data devices. The biometric data may include, but not limited to, a hear rate of the user, a pulse rate of the user, a blood pressure of the user, a skin conductance of the user, a body temperature of the user, a blood sugar level of the user, and the like.

In step 725, the sentiment analysis ML model receives history transactional data of the user. The history transactional data may be received from the plurality of data devices. The history transactional data may include, but not limited to, transaction charges, transaction date and time, transaction locations, merchants, warranty information, and the like.

In step 730, the sentiment analysis ML model performs a sentiment analysis on the image data, voice data, geolocation data, biometric data, and the history transactional data to produce a result of sentiment analysis. The sentiment analysis may include evaluating a blood pressure level of the user, a heart rate level of the user, a blood sugar level of the user, whether the user is happy, sad, angry, frustrated, nervous, or frightened, how stressful of the user, what the voice tone/intonation of the user is, what the speaking speed of the user is, whether the user is disoriented, whether the user is making a large shopping, and the like. The result comprises an emotional state of the user that may comprise multiple components such as, nervousness level, heart rate level, voice pattern, and so forth, along with time stamps indicative of when a component occurs.

In step 735, the sentiment analysis ML model transmits the result of the sentiment analysis to the decision engine.

The emotional state of the user having multiple components is communicated to and received by the decision engine to make a decision based on the emotional date and user-configured criteria of the user.

Figure 8:
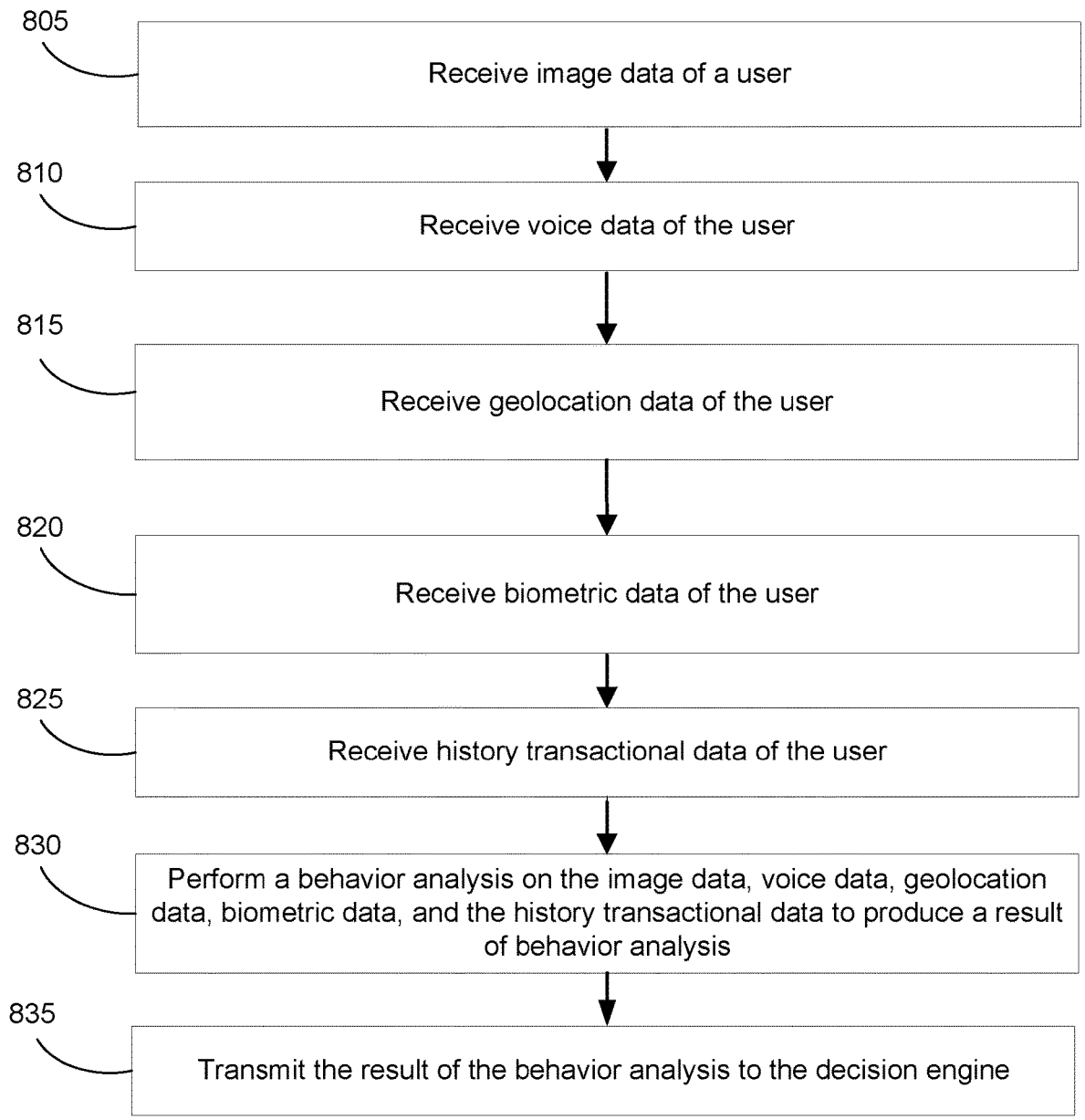
FIG. 8 is a flow chart illustrating a process of performing a behavior analysis according to an example embodiment.

The behavior analysis ML model may be trained using labeled or unlabeled data collected from the plurality of data devices. The behavior analysis ML model is then used to perform behavior analysis on the multi-channel data inputs. FIG. 8 illustrates a flow chart of a method 800 for performing behavior analysis by the behavior analysis ML model on multi-channel data inputs according to an example embodiment. FIG. 8 may reference the same or similar components as those illustrated in FIGS. 1-7, including a plurality of data devices, a server, a database, and a user device. The method 800 may be implemented in the system 100 of FIG. 1, the system 300 of FIG. 3 and/or the system 500 of FIG. 5 and may comprise the following steps.

In step 805, the behavior analysis ML model receives image data of a user. The image data may be received from the plurality of data devices. The image data may include but not limited to face image of the user, walking image of the user, dining image of the user, shopping image of the user, driving image of the user, and the like.

In step 810, the behavior analysis ML model receives voice data of the user. The voice data may be received from the plurality of data devices. The voice data may include, but not limited to, conversation of the user, speech of the user, presentation of the user, phone calling of the user, yelling of the user, crying of the user, shouting of the user, and the like.

In step 815, the behavior analysis ML model receives geolocation data of the user. The geolocation data may be received from the plurality of data devices. The geolocation data may include, but not limited to, GPS data, user-provided location data, location image, and the like.

In step 820, the behavior analysis ML model receives biometric data of the user. The biometric data may be received from the plurality of data devices. The biometric data may include, but not limited to, a hear rate of the user, a pulse rate of the user, a blood pressure of the user, a skin conductance of the user, a body temperature of the user, a blood sugar level of the user, and the like.

In step 825, the behavior analysis ML model receives history transactional data of the user. The history transactional data may be received from the plurality of data devices. The history transactional data may include, but not limited to, transaction charges, transaction date and time, transaction locations, merchants, warranty information, and the like.

In step 830, the behavior analysis ML model performs a behavior analysis on the image data, voice data, geolocation data, biometric data, and the history transactional data to produce a result of behavior analysis. The behavior analysis may include evaluating a walking gesture of the user, whether the user is crying or sweating, whether the user is speaking unusually loudly, whether the user is moving erratically, whether the user is disoriented, whether the user is driving a car, and the like. The result comprises a behavioral state of the user that may comprise multiple components such as, walking gestures, sweating, and so forth, along with time stamps indicative of when a component occurs.

In step 835, the behavior analysis ML model transmits the result of the behavior analysis to the decision engine. The behavioral state of the user having multiple components is communicated to and received by the decision engine to make a decision based on the behavioral date and user-configured criteria of the user.

Figure 9:
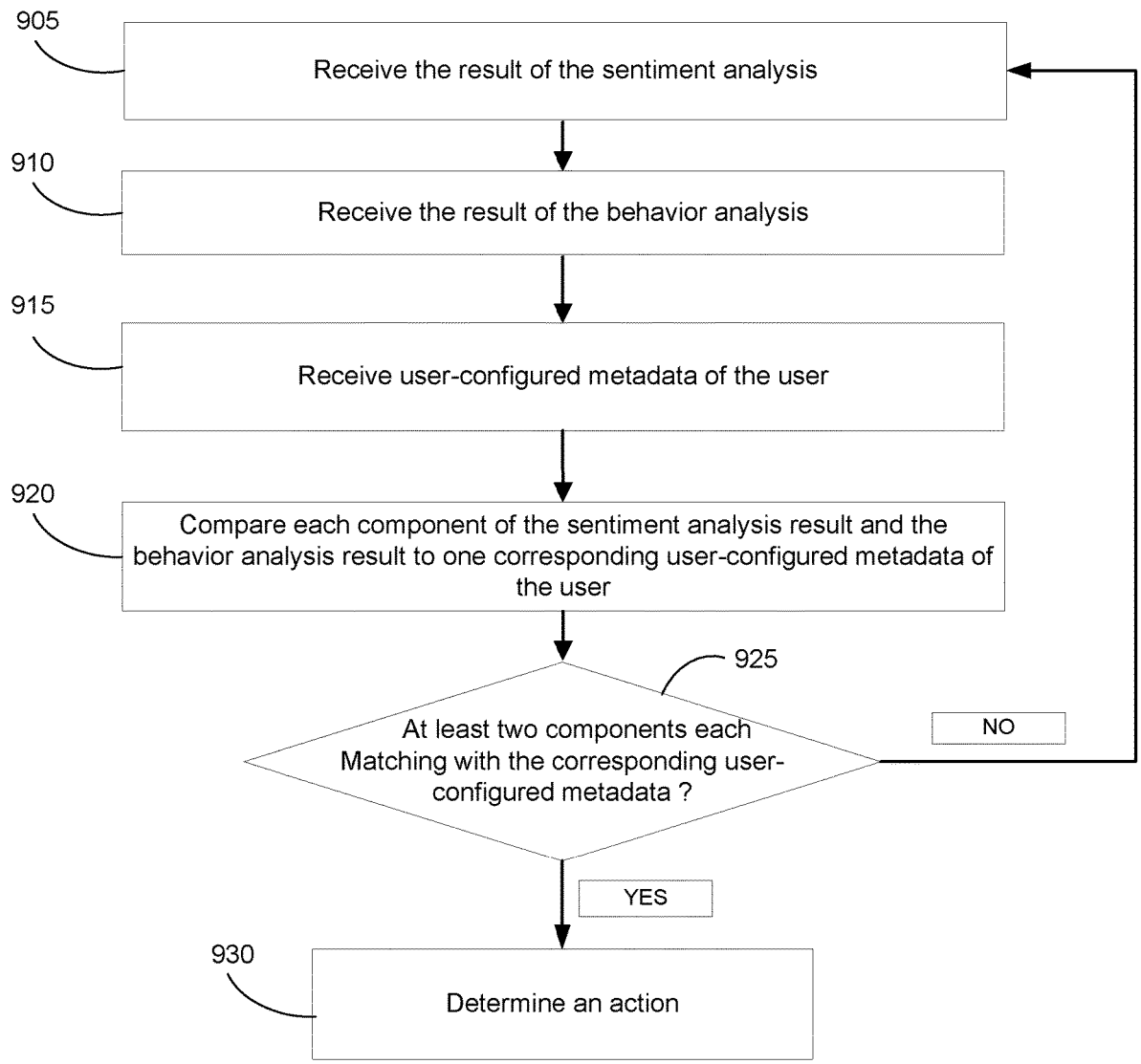
FIG. 9 is a flow chart illustrating a process of making a decision by a decision engine according to an example embodiment.

After receiving the emotional state produced by the sentiment analysis ML model and the behavioral sate produced by the behavior analysis ML model, the decision engine can make a decision for performing an action based on the emotional state and the behavioral state of the user. FIG. 9 illustrates a flow chart of a method 900 for the decision engine making a decision according to an example embodiment. FIG. 9 may reference the same or similar components as those illustrated in FIGS. 1-8, including a plurality of data devices, a server, a database, and a user device. The method 900 may be implemented in the system 100 of FIG. 1, the system 300 of FIG. 3 and/or the system 500 of FIG. 5 and may comprise the following steps.

In step 905, the decision engine receives the result (the emotional state of the user) produced by the sentiment analysis ML model at step 730 of the method 700. The emotional state can be represented as a multi-component vector, such as emotional state=(nervousness level, heart rate level, voice pattern . . . time stamp 1, time stamp 2 . . . ).

In step 910, the decision engine receives the result (the behavioral state of the user) produced the behavior analysis ML model at step 830 of the method 800. The behavioral state can be represented as a multi-component vector, such as behavioral state=(walking gestures, sweating . . . time stamp 1, time stamp 2 . . . ).

In step 915, the decision engine receive from the user device user-configured data of the user that comprises the user-configured criteria. The user-configured criteria may be represented as a data structure for example, user-configured criteria=(call ridesharing app when the speaking speed of the user is greater than 5 words per second and also the user is walking staggeringly; freeze the credit card account of the user when the heart rate of the user is higher than 100 beats per minutes after 11:00 PM local time; . . . ).

In step 920, the decision engine compares each component of the sentiment analysis result and the behavior analysis result to one corresponding user-configured metadata of the user. For example, the decision engine compares the heart rate level in the emotional state with the heart rate lever threshold in the user-configured criteria, whether the walking gesture in the behavioral state of the user is a staggering gesture specified in the user-configured criteria, and the like.

In step 925, the decision engine determines whether at least two components match with the corresponding user-configured metadata. Compared to the existing technologies where a single component is used for making a decision, the present disclosure uses at least two components to more accurately make a decision. The at least two components can be from the emotional state of the user or the behavioral state of the user only, or from both the emotional state of the user and the behavioral state of the user. For example, based on the user-configured metadata, one component can be a heart rate level from the emotional state of the user and another component can be a walking gesture from the behavioral state of the user. If the decision engine determines that both of the at least two components do not match with the corresponding user-configured metadata, that is, a "NO" branch is selected, then the method 900 flows back to the step 905. If the decision engine determines that both of the at least two components match with the corresponding user-configured metadata, that is, a "YES" branch is selected, then the method 900 proceeds to step 930.

In step 930, the decision engine makes a decision for performing an action. For example, when one component of the at least two components is a heart rate level of 105 beats per minute from the emotional state that is faster than 100 beats per minute specified in the user-configured criteria, and another component of the at least two components is that the user is experiencing nervous or stressed at 11:30 PM local time from the behavior state that is later than 11:00 PM local time specified in the user-configured criteria, the decision engine can make a decision for performing an action to free the credit card account of the user as specified in the user-configured criteria.

Figure 10:
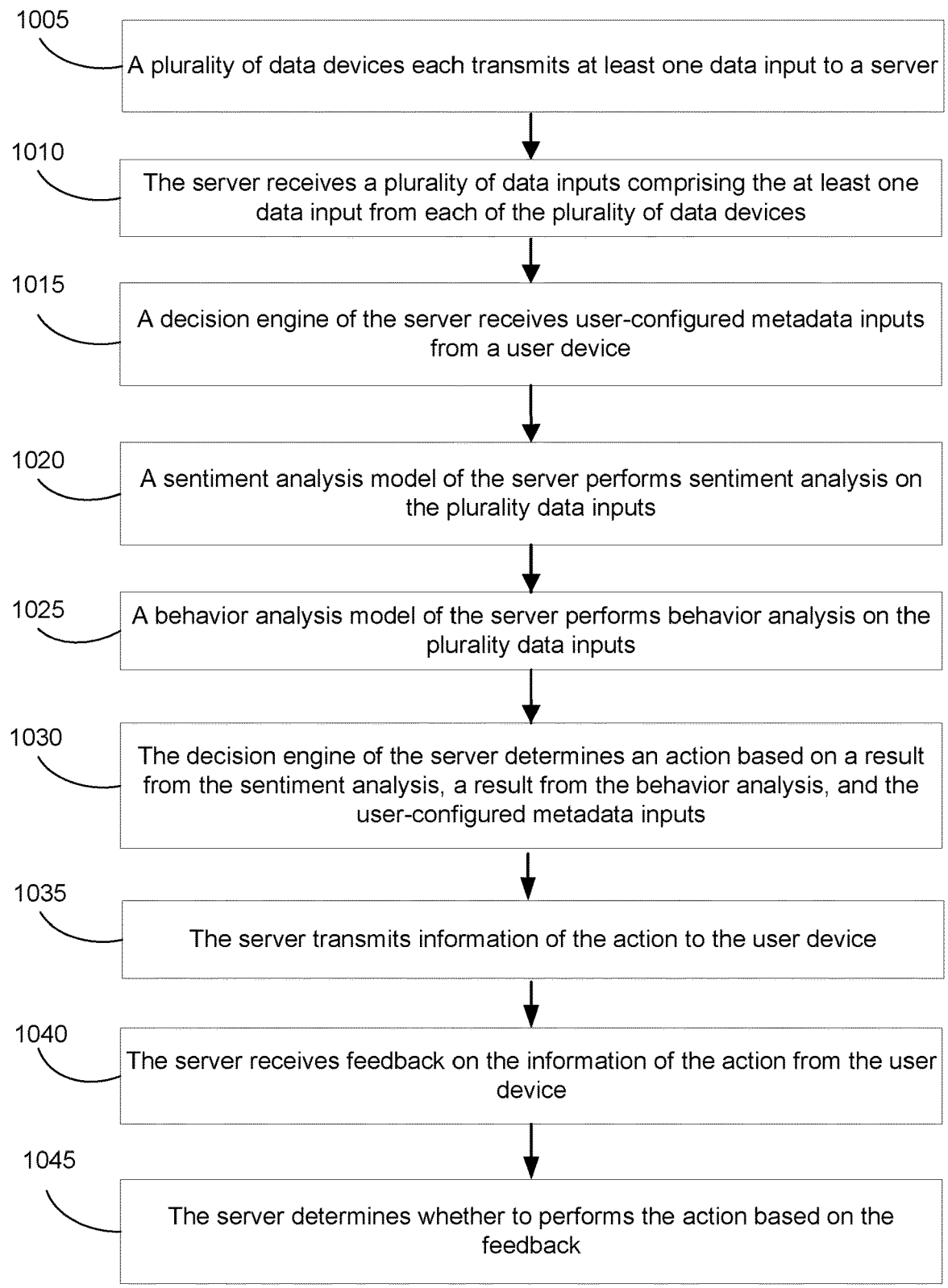
FIG. 10 is a diagram of a system for decision-making with multi-channel data inputs according to an example embodiment.

In some embodiments, to further enhance the accuracy of the emotional state determined by the sentiment analysis, the behavioral sate determined by the behavior analysis, and the decision/action determined by the decision engine, the emotional state, the behavioral state and the decision/action may be communicated to the user and the user may provide feedback. With the feedback from the user on the emotional state, the behavioral state and the decision/action, the feedback can be used to modify the action determined by the decision engine and also be used to retrain the ML models. FIG. 10 illustrates a flow chart of a method 1000 for making a decision using multi-channel data inputs and feedback from the user according to an example embodiment. FIG. 10 may reference the same or similar components as those illustrated in FIGS. 1-9, including a plurality of data devices, a server, a database, and a user device. The method 1000 may be implemented in the system 100 of FIG. 1, the system 300 of FIG. 3 and/or the system 500 of FIG. 5 and may comprise the following steps.

The steps 1005-1030 in this method 1000 are the same or substantially same as the steps 205-230 in the method 200 respectively, details of which are not repeated herein. In step 1005, a plurality of data devices each transmits at least one data input to a server (e.g., the server 120 in the system 100 of FIG. 1, the server 320 in the system 300 of FIG. 3, or the server 520 in the system 500 of FIG. 5). In step 1010, the server receives a plurality of data inputs comprising the at least one data input from each of the plurality of data devices. In step 1015, a decision engine of the server receives user-configured metadata inputs from a user device. In step 1020, a sentiment analysis model of the server performs sentiment analysis on the plurality data inputs. In step 1025, a behavior analysis model of the server performs behavior analysis on the plurality data inputs. In step 1030, the decision engine of the server determines an action based on a result from the sentiment analysis, a result from the behavior analysis, and the user-configured metadata inputs.

In step 1035, the server transmits information of the action to the user device. The information of the action may comprise an emotional state of the user determined by the sentiment analysis model, a behavioral state of the user determined by the behavior analysis model, the corresponding user-configured metadata, a decision/action determined by the decision engine, and a request for feedback (user inputs) on the information of the action. The information of the action can be presented to the user in various fashions, such as, text messages, a web portal displayed on the user device, and so on. For example, a text message may be like "we declined your purchase based on your emotional state, but if you really want it, try again." Also a text message may be like "we hope you are able to relax, because we were able to detect that you're angry or stressed."

In step 1040, the server receives feedback on the information of the action from the user device. In response to receiving the information of the action, the user may use the user device to provide their feedback regarding the information of the action. For example, the user may approve the decision/action. The user may decline the decision/action. The user may point out error information, such as one or more component of the emotional state and/or the behavioral state are incorrect. For example, the user may respond that "I am not stressed at all!" The user may further provide correct information in terms of the error information. The feedback can be provided in various forms, e.g., text messages, selections from the web portal displayed on the user device, inputs on the web portal displayed on the user device, and the like. For example, the web portal may list all the different times that the user was determined to be stressed by the ML models, and the user can select one or more of those to indicate that they were not actually stressed during those times, or the user could confirm one or more those to indicate that they were indeed stressed during those times. Such selections can be provided back to the server.

In step 1045, the server determines whether to perform the action based on the feedback. The server may modify the action based on the feedback. If the user approves the action, the server may proceed to perform the action. If the user decline the action, the server may proceed to cancel the action, and may then reevaluate the emotional state of the user and the behavioral state of the user using the feedback. For example, if the action may be to decline a purchase based on the decision determined by the decision engine, the server may then allow the purchase to go through after receiving the feedback indicating that the user is not actually compromised emotionally. The ML models may be retrained using the feedback. For instance, the user may provide the feedback saying "I'm not actually stressed, I'm fine". The user may further get another biometric readings that are communicated back to the server to prove that they are actually fine. Then the ML models can be tuned based on the feedback and/or added inputs.

An example in the context of the method 1000 is illustrated herein. When a behavioral state of a user fits into the normal behavioral pattern of the user, even if the emotional state of the user is out of line, the method 1000 may still allow what is happening to proceed based on feedback from the user, for example, allowing a purchase to go through. For instance, if the user regularly buys five packs of baseball cards every day and the user happens to try to buy five packs of baseball cards when the user is stressed, the system disclosed herein can detect that the user is stressed because of the emotional state is out of line (e.g., indicating anomalies in one or more biometric data) according to the sentiment analysis model. However, the behavior of the user is not actually anomalous, that is, the user's behavior fits into what it is expected from the behavior analysis model. The system can make a decision to decline the purchase based on the emotional state of the user. However, the user may provide feedback to disapprove the decision made by the system. Thus, the system can go ahead to allow the purchase to go through according to the feedback from the user. If instead the user is trying to buy 50 packs of baseball cards because the user is stressed and planning on taking those home and opening all of them, then the system can decline that purchase because both the emotional state of the user and the behavioral pattern of the user are anomalous. In that situation, the user may prove feedback of approving the decision made by the system: decline the purchase.

AS described above, the present disclosure can provide a service to a user, in which the user recognizes that his or her emotional state and/or behavioral sate can impact his or her abilities of making decisions, and wants to control his or her behaviors in such situations. The user can configure the systems disclosed here to determine whether the user is in such situations and what the user would have the systems to do when that situation happens. The user can opt in the service provided by this disclosure and would agree that various data about the user can be collected from various data devices. The various data may be only stored for a certain amount of time or as long as necessary, and can be used for training the ML models to accurately determine the emotional state and/or behavioral state of the user.

In some embodiments, a user may not provide user-configured criteria/rules in advance. In such scenarios, the decision engine may recommend a decision/action based on the emotional state of the user and/or the behavioral state of the user by referring to the decisions/actions made in the past for other users based on similar emotional states and/or behavioral states of the other users. For example, if the user is outside of their home after 11:00 PM local time and is detected to have an elevated heart rate indicating a high stress level, the credit card of the user may be frozen by referring to other user's experiences in the past, even though the user has not yet configured such rules/criteria to freeze his or her credit card. In some embodiments, if a user has not yet configured such rules or criteria to freeze his or her credit card, the user's card may not be frozen unless a suspicious and potentially fraudulent activity is detected. In this case, the user may be prompted via a push notification or other communication channel with a "check-in" message.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the user device, data device, server, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decision-making system with multi-channel inputs, comprising:
an application comprising instructions for execution on a plurality of devices, the application configured to communicate at least one data input received by each of the plurality of devices to a server; and
the server in data communication with the plurality of devices, the server comprising a decision engine, a sentiment analysis machine learning model, and a behavior analysis machine learning model, the server being configured to:
receive, from the plurality of devices, a plurality of data comprising image data, voice data, text data, geolocation data, biometric data, transactional data, and user metadata;
train, using the plurality of data, the sentiment analysis machine learning model and a behavior analysis machine learning model;
receive the at least one data input from each of the plurality of devices;
perform, using the sentiment analysis machine learning model, a sentiment analysis on the at least one data input to generate sentiment information indicative of an emotional state of a user;
perform, using the behavior analysis machine learning model, a behavior analysis on the at least one data input to generate behavior information indicative of a behavioral state of the user;
determine, using the decision engine, a responsive action based on the sentiment information and the behavior information; and
perform the responsive action.

2. The system of claim 1, wherein:
the plurality of devices comprise at least one device selected from the group of a device capable of generating image data, a device cable of generating voice data, a device capable of generating biometric data, a device capable of generating geolocation data, a device capable of storing transactional data, a device capable of generating text data, and a device capable of receiving customer metadata; and
the biometric data comprises at least one selected from the group of a heart rate, a pulse rate, a body temperature, a skin conductance change, a blood pressure level, and a blood sugar level.

3. The system of claim 2, wherein the at least one data input comprises at least one selected from the group of an image data input, a voice data input, a text data input, a geolocation data input, a biometric data input, a transactional data input, and a user metadata input.

4. The system of claim 1, wherein the application is configured to cause each of the plurality of devices to receive, process, and transmit the at least one data input.

5. The system of claim 1, wherein the server is further configured to pre-process the at least one data input before the at least one data input is fed into the sentiment analysis machine learning model, the behavior analysis machine learning model and/or the decision engine, the pre-processing including reformatting the at least one data input.

6. The system of claim 1, wherein:
the sentiment analysis machine learning model comprises at least one selected from the group of a supervised machine learning model, an unsupervised machine learning model, and a reinforcement machine learning model; and
the behavior analysis machine learning model comprises at least one selected from the group of a supervised machine learning model, an unsupervised machine learning model, and a reinforcement machine learning model.

7. The system of claim 1, wherein the server further comprises a natural language processing model configured to process voice data or text data received from the plurality of devices.

8. The system of claim 7, wherein the processed voice data or text data is transmitted to the sentiment analysis machine learning model, the behavior analysis machine learning model, and/or the decision engine.

9. The system of claim 1, wherein the responsive action is determined based on whether a result of the sentiment analysis and/or a result of the behavior analysis meets a predetermined criteria, wherein the predetermined criteria comprises at least one selected from the group of a time later than a specified time threshold, an emotional stress level greater than a specified emotional stress level threshold, a blood pressure higher than a specified blood pressure threshold, a voice pitch higher than a specified voice pitch threshold, a speaking speed faster than a specified speaking speed threshold, and a sweating amount greater than a specified sweating amount threshold.

10. The system of claim 1, wherein the responsive action comprises at least one selected from the group of cancelling a transaction, freezing a financial account, and issuing an alert.

11. The system of claim 1, wherein the responsive action comprises at least one selected from the group of notifying a family member of the user, notifying a law enforcement officer, calling a taxi, and donating money.

12. The system of claim 1, wherein the server is further configured to:
transmit a notification of the responsive action to a device of the user, wherein the notification includes a request for user data;
receive from the device of the user the user data in response to the notification; and
modify, through the decision engine, the responsive action based on the user data.

13. The system of claim 1, wherein the server is further configured to:
transmit a notification of the responsive action to a device of the user, wherein the notification includes a request for user data;
receive from the device of the user the user data in response to the notification; and
train the sentiment analysis machine learning model and the behavior analysis model using the user data.

14. The system of claim 13, wherein the user data is received from a web portal displayed on the device of the user.

15. A server for decision-making with multi-channel inputs, comprising:
a processor; and
a decision engine, a sentiment analysis machine learning model, and a behavior analysis machine learning model, wherein the sentiment analysis machine learning model is configured to generate information indicative of an emotional state of a user, and the behavior analysis machine learning model is configured to generate information indicative of a behavioral state of the user,
wherein the processor is configured to:
receive, from the plurality of devices, a plurality of data comprising image data, voice data, text data, geolocation data, biometric data, transactional data, and user metadate;
train, using the plurality of data, the sentiment analysis machine learning model and a behavior analysis machine learning model;
receive at least one data input from each of a plurality of devices, wherein each of the plurality of devices comprises an application comprising instructions for execution on the plurality of devices, and the application is configured to communicate the at least one data input to the server;
perform, using the sentiment analysis machine learning model, a sentiment analysis on the at least one data input to generate sentiment information indicative of the emotional state of the user;
perform, using the behavior analysis machine learning model, a behavior analysis on the at least one data input to generate behavior information indicative of the behavior state of the user;
determine, using the decision engine, a responsive action based on the sentiment information and the behavior information; and
perform the responsive action.

16. The sever of claim 15, wherein the plurality of devices comprise at least one device selected from the group of a device capable of generating image data, a device cable of generating voice data, a device capable of generating biometric data, a device capable of generating geolocation data, a device capable of storing transactional data, a device capable of generating text data, and a device capable of receiving customer metadata; and the biometric data comprises at least one selected from the group of a heart rate, a pulse rate, a body temperature, a skin conductance change, a blood pressure level, and a blood sugar level.

17. The server of claim 16, wherein the at least one data input comprises at least one selected from the group of an image data input, a voice data input, a text data input, a geolocation data input, a biometric data input, a transactional data input, and a user metadata input.

18. The server of claim 15, wherein the server further comprises a conversion model configured to convert voice data received from the plurality of devices to text data for natural language processing.

19. The server of claim 15, wherein the responsive action is determined based on whether a result of the sentiment analysis and/or a result of the behavior analysis meets a predetermined criteria, wherein the predetermined criteria comprises at least one selected from the group of a blood sugar level of a user greater than a specified blood sugar level threshold, a time later than a specified time threshold, an emotional stress level greater than a specified emotional stress level threshold, a blood pressure higher than a specified blood pressure threshold, a voice pitch higher than a specified voice pitch threshold, a speaking speed faster than a specified speaking speed threshold, and a sweating amount greater than a specified sweating amount threshold.

20. A method, comprising:
generating, by a plurality of devices, a plurality of data comprising image data, voice data, text data, geolocation data, biometric data, transactional data, and user metadata;
training, using the plurality of data, a sentiment analysis machine learning model and a behavior analysis machine learning model;
receiving, by a server, at least one data input from each of the plurality of devices, wherein each of the plurality of devices comprises an application comprising instructions for execution on the plurality of devices, and the application is configured to communicate the at least one data input to the server;
performing by the server, using the sentiment analysis machine learning model, a sentiment analysis on the at least one data input to generate sentiment information indicative of an emotional state of the user;
performing by the server, using the behavior analysis machine learning model, a behavior analysis on the at least one data input to generate behavior information indicative of a behavioral state of the user;
determining by the server, through a decision engine, a responsive action based on the sentiment information and the behavior information; and
performing by the server the responsive action.

* * * * *